(12) United States Patent

Ben Dayan et al.

(10) Patent No.: US 12,608,940 B1

(45) Date of Patent: Apr. 21, 2026

(54) DETECTING RELEVANT PORTIONS OF VIDEO FILES BASED ON CLASSIFICATIONS OF IMAGES

(71) Applicant: Amazon Technologies, Inc., Seattle, WA (US)

(72) Inventors: Shachar Flora Ben Dayan, Tel Aviv (IL); Michael Rotman, Petah Tikva (IL); Ido Yerushalmy, Tel Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 237 days.

(21) Appl. No.: 18/322,015

(22) Filed: May 23, 2023

(51) Int. Cl.

| | |
|---|---|
| *G06V 20/40* | (2022.01) |
| *G06V 10/774* | (2022.01) |
| *G06V 20/70* | (2022.01) |
| *G10L 25/57* | (2013.01) |
| *H04N 21/439* | (2011.01) |
| *H04N 21/44* | (2011.01) |

(52) U.S. Cl.
CPC ............ *G06V 20/47* (2022.01); *G06V 10/774* (2022.01); *G06V 20/42* (2022.01); *G06V 20/70* (2022.01); *G10L 25/57* (2013.01); *H04N 21/4394* (2013.01); *H04N 21/44008* (2013.01)

(58) Field of Classification Search
CPC ...... G06V 20/47; G06V 10/774; G06V 20/42; G06V 20/70; G10L 25/57; H04N 21/4394; H04N 21/44008
See application file for complete search history.

(56) References Cited

U.S. PATENT DOCUMENTS

| | | |
|---|---|---|
| 5,351,075 A | 9/1994 | Herz et al. |
| 6,018,768 A | 1/2000 | Ullman et al. |
| 6,457,010 B1 | 9/2002 | Eldering et al. |
| 6,760,916 B2 | 7/2004 | Holtz et al. |
| 7,493,636 B2 | 2/2009 | Kitsukawa et al. |
| 7,752,642 B2 | 7/2010 | Lemmons |

(Continued)

OTHER PUBLICATIONS

Dosovitskiy, Alexey, Lucas Beyer, Alexander Kolesnikov, Dirk Weissenborn, Xiaohua Zhai, Thomas Unterthiner, Mostafa Dehghani et al. "An image is worth 16×16 words: Transformers for image recognition at scale." arXiv preprint arXiv:2010.11929 (2020) Jun. 3, 2021. URL: https://arxiv.org/abs/2010.11929, 22 pages.

(Continued)

*Primary Examiner* — Ming Y Hon
(74) *Attorney, Agent, or Firm* — Athorus, PLLC

(57) ABSTRACT

Relevant portions of broadcasts of live events, such as replays, may be marked or framed by patterns of one or more images. A model is trained with pairs of images and text descriptors to generate image embeddings and text embeddings representative of the images and text descriptors, respectively. Where a pattern of images includes one or more images, a user may specify one or more text descriptors representative of images of the pattern and identify portions of a media file with respect to such images. The model generates text embeddings of the text descriptors, as well as image embeddings of image frames of a video file broadcasted to viewers, including a relevant portion marked or framed by the pattern. Where an image embedding is sufficiently similar to one of the text embeddings, the pattern is detected, and the relevant portion is identified based on the pattern.

20 Claims, 17 Drawing Sheets

(56) References Cited

U.S. PATENT DOCUMENTS

| | | | |
|---|---|---|---|
| 8,627,379 | B2 | 1/2014 | Kokenos et al. |
| 8,630,844 | B1 | 1/2014 | Nichols et al. |
| 8,949,890 | B2 | 2/2015 | Evans et al. |
| 9,697,178 | B1 | 7/2017 | Nichols et al. |
| 10,363,488 | B1 | 7/2019 | Willette et al. |
| 12,327,088 | B1* | 6/2025 | Li .......................... G06F 40/211 |
| 2003/0028873 | A1 | 2/2003 | Lemmons |
| 2007/0029112 | A1 | 2/2007 | Li et al. |
| 2008/0037951 | A1 | 2/2008 | Cho et al. |
| 2010/0050202 | A1 | 2/2010 | Kandekar et al. |
| 2011/0217019 | A1 | 9/2011 | Kamezawa et al. |
| 2012/0008693 | A1* | 1/2012 | Yao ................ H04N 21/234381 |
| | | | 375/E7.189 |
| 2013/0182119 | A1* | 7/2013 | Eledath ................... G06T 7/215 |
| | | | 348/207.11 |
| 2015/0248917 | A1 | 9/2015 | Chang et al. |
| 2016/0065884 | A1 | 3/2016 | Di Censo et al. |
| 2016/0117928 | A1 | 4/2016 | Hodges et al. |
| 2016/0117940 | A1 | 4/2016 | Gomory et al. |
| 2016/0225410 | A1 | 8/2016 | Lee et al. |
| 2016/0321506 | A1 | 11/2016 | Fridental et al. |
| 2017/0099526 | A1 | 4/2017 | Hua et al. |
| 2017/0201779 | A1 | 7/2017 | Publicover et al. |
| 2017/0259115 | A1 | 9/2017 | Hall |
| 2017/0266491 | A1 | 9/2017 | Rissanen et al. |
| 2018/0084291 | A1 | 3/2018 | Wei et al. |
| 2019/0356948 | A1 | 11/2019 | Stojancic et al. |
| 2020/0097502 | A1 | 3/2020 | Trim et al. |
| 2021/0329352 | A1* | 10/2021 | Thomas ........... H04N 21/23424 |
| 2022/0067384 | A1 | 3/2022 | Kaushik et al. |
| 2022/0374602 | A1* | 11/2022 | Park ...................... G06F 40/295 |
| 2023/0177810 | A1* | 6/2023 | Xu ....................... G06V 10/774 |
| | | | 382/159 |
| 2023/0281826 | A1* | 9/2023 | Schulter ............... G06V 10/761 |
| | | | 382/173 |
| 2024/0087265 | A1* | 3/2024 | Park ...................... G06F 40/289 |
| 2024/0147025 | A1* | 5/2024 | Graciarena .......... H04N 21/814 |
| 2024/0160673 | A1* | 5/2024 | Dela Rosa ............. G06V 20/20 |
| 2024/0371132 | A1* | 11/2024 | Uziel ................... G06V 10/761 |

OTHER PUBLICATIONS

Frome, Andrea, Greg S. Corrado, Jon Shlens, Samy Bengio, Jeff Dean, Marc'Aurelio Ranzato, and Tomas Mikolov. "DeViSE: A deep visual-semantic embedding model." Advances in Neural Information Processing Systems 26 (2013). URL: https://proceedings.neurips.cc/paper_files/paper/2013/hash/7cce53cf90577442771720a370c3c723-Abstract.html.

Li, Ang, Allan Jabri, Armand Joulin, and Laurens Van Der Maaten. "Learning visual n-grams from web data." In Proceedings of the IEEE International Conference on Computer Vision, pp. 4183-4192. 2017. URL: https://openaccess.thecvf.com/content_iccv_2017/html/Li_Learning_Visual_N-Grams_ICCV_2017_paper.html.

Radford, Alec, Jong Wook Kim, Chris Hallacy, Aditya Ramesh, Gabriel Goh, Sandhini Agarwal, Girish Sastry et al. "Learning transferable visual models from natural language supervision." In International Conference on Machine Learning, pp. 8748-8763. PMLR, 2021. URL: https://proceedings.mlr.press/v139/radford21a.html.

Socher, Richard, Milind Ganjoo, Christopher D. Manning, and Andrew Ng. "Zero-shot learning through cross-modal transfer." Advances in Neural Information Processing Systems 26 (2013). 10 pages. URL: https://proceedings.neurips.cc/paper_files/paper/2013/hash/2d6cc4b2d139a53512fb8cbb3086ae2e-Abstract.html.

Vaswani, A. et al., 2017, Attention is All you Need. In Annual Conference on Neural Information Processing Systems 2017, Dec. 4-9, 2017, Long Beach, CA, USA, pp. 6000-6010, Retrieved: https://arxiv.org/pdf/1706.03762.pdf, 15 pages.

* cited by examiner $$\Delta t = t_B - t_A$$

PATTERN FOR DISPLAYING HIGHLIGHTS DURING BROADCAST OF LIVE EVENT

PATTERN OF IMAGES CONSISTENT WITH CLASSIFICATION TERM
DETECTED WITHIN MULTIMEDIA STREAM

RELEVANT PORTION IDENTIFIED BASED ON PATTERN
OF IMAGES PROVIDED TO USER $$\Delta t = t_2 - t_1$$

PATTERN DEFINED BASED ON PRESENCE OF CLASSIFIED IMAGES
IN MULTIMEDIA STREAM

PATTERN DEFINED BY DELAY AND DURATION FOLLOWING DETECTION
OF CLASSIFIED IMAGE IN MULTIMEDIA STREAM

PROBABILITIES THAT IMAGES DEPICT
CLASSIFICATION TERMS

RELEVANT PORTIONS IDENTIFIED BASED ON DETECTED
PATTERNS OF IMAGES

IMAGES AND AUDIO SIGNALS CAPTURED
DURING LIVE EVENT

TRAINING DATA OBTAINED FROM IMAGES AND TRANSCRIBED
AUDIO CAPTURED DURING LIVE EVENT

DETECTING RELEVANT PORTIONS OF VIDEO FILES BASED ON CLASSIFICATIONS OF IMAGES

BACKGROUND

Today, broadcasts of live events, including organized events such as sporting events, are some of the most popular media programs that are made available to viewers in broadcast or streaming formats. For example, by some estimates, the thirty most-watched media programs in the United States in 2022 were broadcasts of live events, and twenty-nine of the thirty media programs were broadcasts of sporting events.

Frequently, many broadcasts or live events are summarized upon their conclusion, and a summary of the broadcast or the live event may be generated. A summary (or a synopsis) may include one or more relevant or noteworthy portions of a broadcast of a live event, and may be made available to viewers, such as in a news report or another work, which may be presented to viewers via the same medium by which a broadcast was aired or streamed, or via a different medium.

Identifying relevant or noteworthy portions (e.g., clips) of a broadcast of a live event for inclusion in a summary of the broadcast or the live event is a challenging and sometimes labor-intensive task, however. Typically, such portions are identified by humans who viewed the broadcast or the live event and tagged, designated or otherwise selected such portions, or times at which such portions occurred, as relevant or noteworthy. A summary of the broadcast or the live event may then be prepared, e.g., by copying video signals and audio signals of the broadcast that depict or represent such portions, and made available to viewers on television or via one or more networked devices. Such processes are complex undertakings that ordinarily require at least one human to view each of the broadcasts, and result in summaries that are generated most often occur after the live events have concluded, not while the broadcasts are in progress. Where multiple broadcasts of live events occur simultaneously, the number of humans or the amount of time required to generate summaries of each of such broadcasts or such live events may be significant.

Occasionally, broadcasts of live events are marked by patterns of image frames, templates or other visual identifiers that are presented on screens to users. For example, a broadcast of a sporting event or another organized event that is televised live may sometimes frame the playing of a replay, a highlight or another non-live aspect of the sporting event in accordance with a pattern, e.g., the display of a logo or an image, followed by a display of the replay, the highlight or the other non-live aspect of the sporting event, and the display of another logo or image. Likewise, a broadcast of a news program may display a logo or an image prior to departing for a commercial break, followed by one or more advertisements or other messages, before displaying another logo or image upon a return from the commercial break. Any other aspects of a broadcast of a live event may be presented to viewers in a similar manner, and framed by patterns of logos, images or other features prior to and following the display of such aspects.

DETAILED DESCRIPTION

As is set forth in greater detail below, the present disclosure is directed to systems and methods for detecting relevant portions of a video file, or a multimedia file, based on the classification of images of the video file. More specifically, where a multimedia stream representing a broadcast of video signals and audio signals captured during a live event is identified and transmitted to devices of viewers in one or more files, and the video signals include portions of the broadcast that are framed by or associated with a pattern of one or more logos, images or other visual features, such portions may be identified by providing image frames of the video signals to a model that has learned to determine probabilities that the image frames depict an image that is consistent with a predetermined classification term.

The model may be configured to learn to detect relevant portions of a video file, in an unsupervised manner, such as a contrastive learning manner, by providing a training set including matching pairs of images and text descriptors to the model. Where the model includes an image encoder and a text encoder, the model is trained to maximize a similarity (e.g., a cosine similarity) between embeddings generated by the image encoder and the text encoder for a matching pair of an image and a text descriptor, and to minimize the similarity between embeddings generated by the image encoder and the text encoder for non-matching pairs of the image and other text descriptors.

Subsequently, where a video file includes images broadcast to viewers during a live event, a predetermined set of classification terms may be received from a user, who may be associated with the broadcast or the live event in any manner. The model may be configured to generate text embeddings for each of the classification terms, and to generate image embeddings for each of the image frames of the video file. Where a pattern of framing a relevant portion of a video file is known, e.g., based on images that precede or follow the relevant portion, and such images are identified where the image embeddings generated for such images are consistent with the text embeddings generated for the classification terms, the relevant portion may be identified and stored, or utilized for any purpose.

Figure 1A:
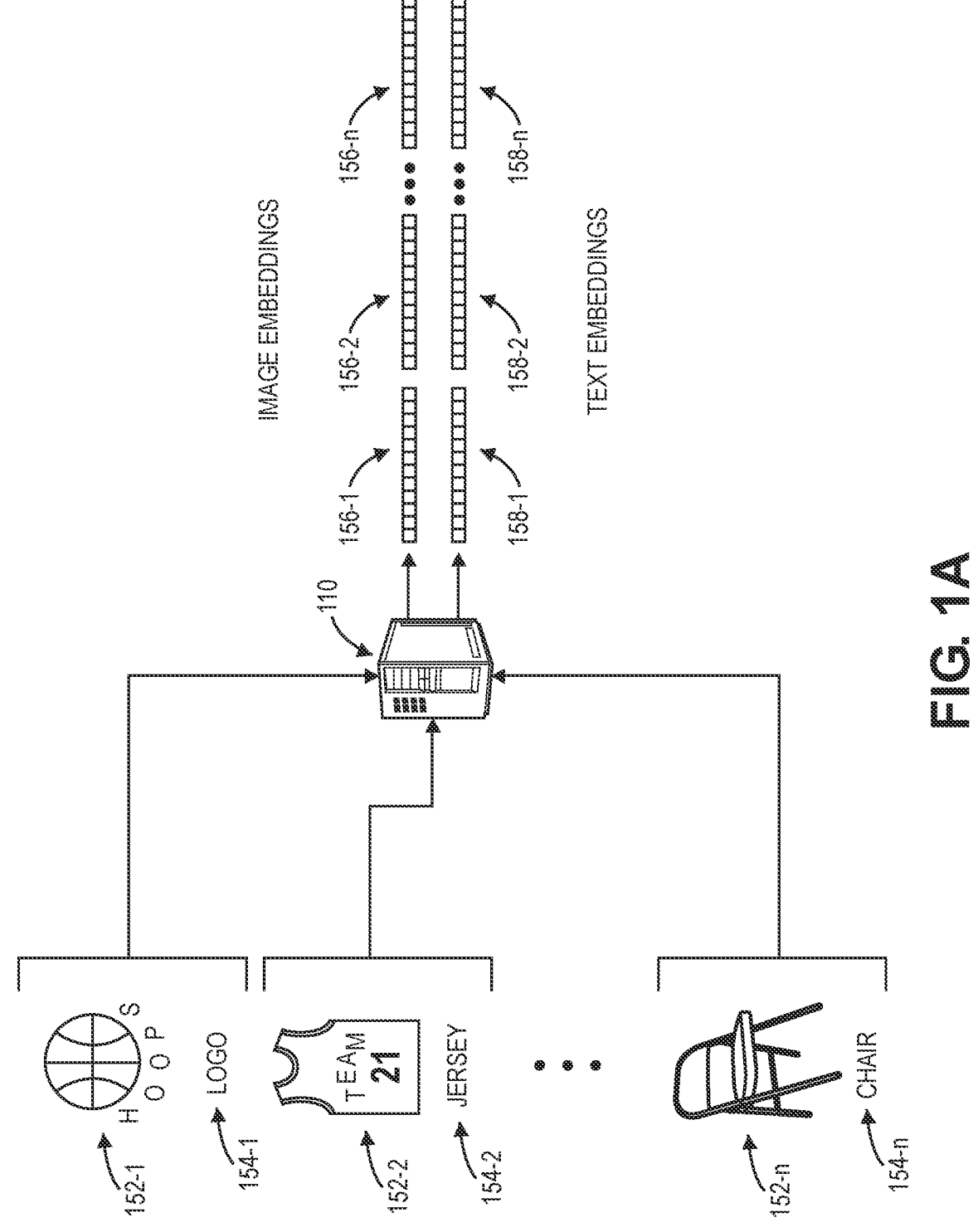
FIGS. 1A through 1G are views of aspects of one system for detecting relevant portions of video files in accordance with implementations of the present disclosure.

Referring to FIGS. 1A through 1G, views of aspects of one system 100 for detecting relevant portions of video files in accordance with implementations of the present disclosure are shown. As is shown in FIG. 1A, a media distribution system 110 having one or more servers or other computer devices or systems is configured to train a model having an image encoder and a text encoder to generate embeddings from a set of pairs of images and text descriptors of such images. The pairs include an image 152-1 of a logo relating to basketball, and a corresponding text descriptor (or label) 154-1 of the image 152-1, viz., "logo," as well as an image 152-2 of a jersey (or a shirt or another article of clothing) worn while playing basketball, and a corresponding text descriptor (or label) 154-2 of the image 152-2, viz., "jersey," along with an image 152-$n$ of a chair, and a corresponding text descriptor (or label) 154-$n$ of the image 152-$n$, viz., "chair." Each of the text descriptors 154-1, 154-2 . . . 154-$n$ may be identified or selected from a common domain, such as words relating to basketball.

The media distribution system 110 may provide the pairs of images and text descriptors to a model having an image encoder and a text encoder that are trained to generate embeddings, e.g., vectors, within a common, shared latent space. For example, given the images 152-1, 152-2 . . . 152-$n$, the image encoder may generate a plurality of image embeddings 156-1, 156-2 . . . 156-$n$, and given the text descriptors 154-1, 154-2 . . . 154-$n$, the text encoder may generate a plurality of text embeddings 158-1, 158-2 . . . 158-$n$. The image encoder and the text encoder may be trained to maximize cosine similarities of the n pairs of image embeddings 156-1, 156-2 . . . 156-$n$ and matching text embeddings 158-1, 158-2 . . . 158-$n$, while also minimizing cosine similarities of the $(n^2-n)$ pairs of image embeddings 156-1, 156-2 . . . 156-$n$ and non-matching text embeddings 158-1, 158-2 . . . 158-$n$.

In some implementations, the model may be trained in an unsupervised manner, such as according to a contrastive language-image pre-training technique. In some implementations, the image encoder may be a vision transformer, and the text encoder may be a text transformer.

The n pairs of images and text descriptors may be of any number, e.g., thousands of images and corresponding text descriptors, and may have been obtained from any source. In some implementations, the images and the text descriptors may be identified from one or more external resources, e.g., network sites (such as web sites). For example, where an image that may be obtained from an external resource has an associated set of alternate text identifying an appearance, a purpose or a function of the image, which may be presented to a user if the user is unable to view the image, e.g., due to a poor connection or any coding errors, or if the user is visually impaired, the text descriptor of the image may be determined from the set of alternate text. Alternatively, where an image is one of a set of image frames of a multimedia file, alternate text for the image may be determined from audio signals corresponding to the image, e.g., by transcribing such audio signals and identifying words spoken at a time corresponding to a display of the image in the multimedia file. For example, where an image is one of a plurality of images captured or transmitted during a broadcast of a prior live event, the text descriptors may be identified from a transcript of audio signals that were transmitted concurrently or along with the plurality of images during the broadcast of the prior live event. The audio signals may be transcribed automatically and in real time or in near-real time, e.g., for inclusion as captions to be transmitted and displayed along with the plurality of images, or manually or automatically at a later time. Pairs of images and corresponding text descriptors may also be identified or determined in any other manner.

Figure 1B:
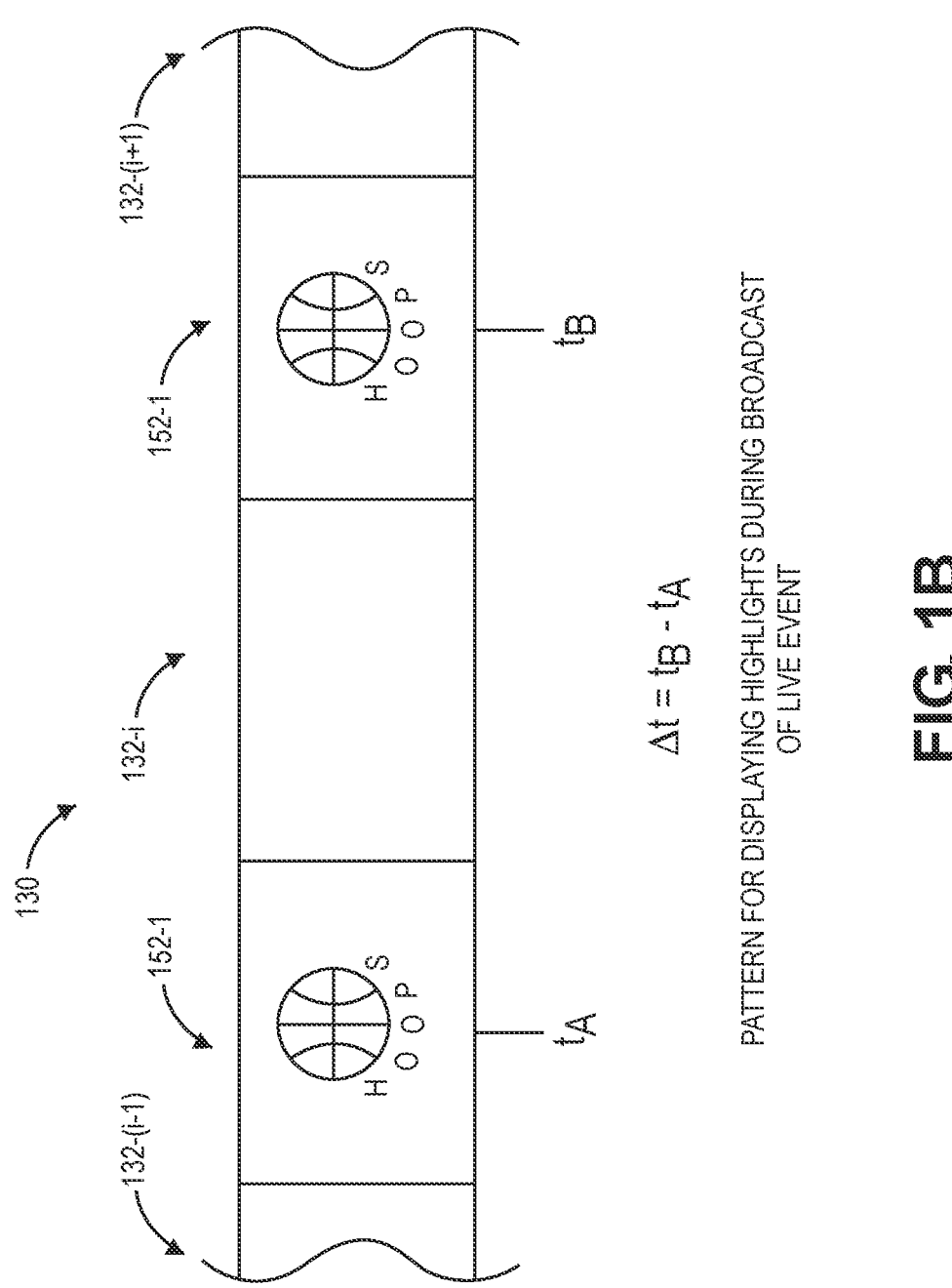

A relevant portion of a multimedia file may be identified based on a pattern of images that may appear during a playing of a multimedia file, which may be identified, selected or designated by a user, e.g., an actor, a director, a participant, a producer, a viewer, or any other person associated with a broadcast of a live event, or in any other manner. For example, during a broadcast of a live event, such as a sporting event or another organized event, when images of an activity or an event that previously occurred during the live event are to be replayed to viewers, the replay of the activity or the event may be preceded by a predetermined image and followed by a predetermined image, which may be the same predetermined image that preceded the replay or another images. As is shown in FIG. 1B, one pattern may involve a display of a logo, e.g., the image 152-1, following one portion 132-($i$–1) of the video file 130 at a time $t_A$, and a display of another logo, e.g., the image 152-1, prior to another portion 132-($i$+1) of the video file 130 at a time $t_B$. Where the difference in time $\Delta t$ between the time $t_B$ and the time $t_A$ is less than a predetermined threshold, a portion 132-$i$ of the video file 130 between the time $t_B$ and the time $t_A$ may be identified as particularly relevant. The logos thus act as a visual set-off that signals to viewers of a broadcast of a live event that displayed images between the logos correspond to portions of the live event that may have already occurred, or may otherwise differ from the broadcast of the live event. In some implementations, the portions 132-($i$–1), 132-($i$+1) may include images that were transmitted in real time or near-real time shortly after such images were captured during the broadcast of the live event, and the portion 132-$i$ may include images that are not transmitted in real time or near-real time after having been captured, or are otherwise different from the images of the portions 132-($i$–1), 132-($i$+1), e.g., a replay of an activity or event that occurred prior to the time $t_A$, an interview with one or more persons associated with the live event, or any other content.

Figure 1C:
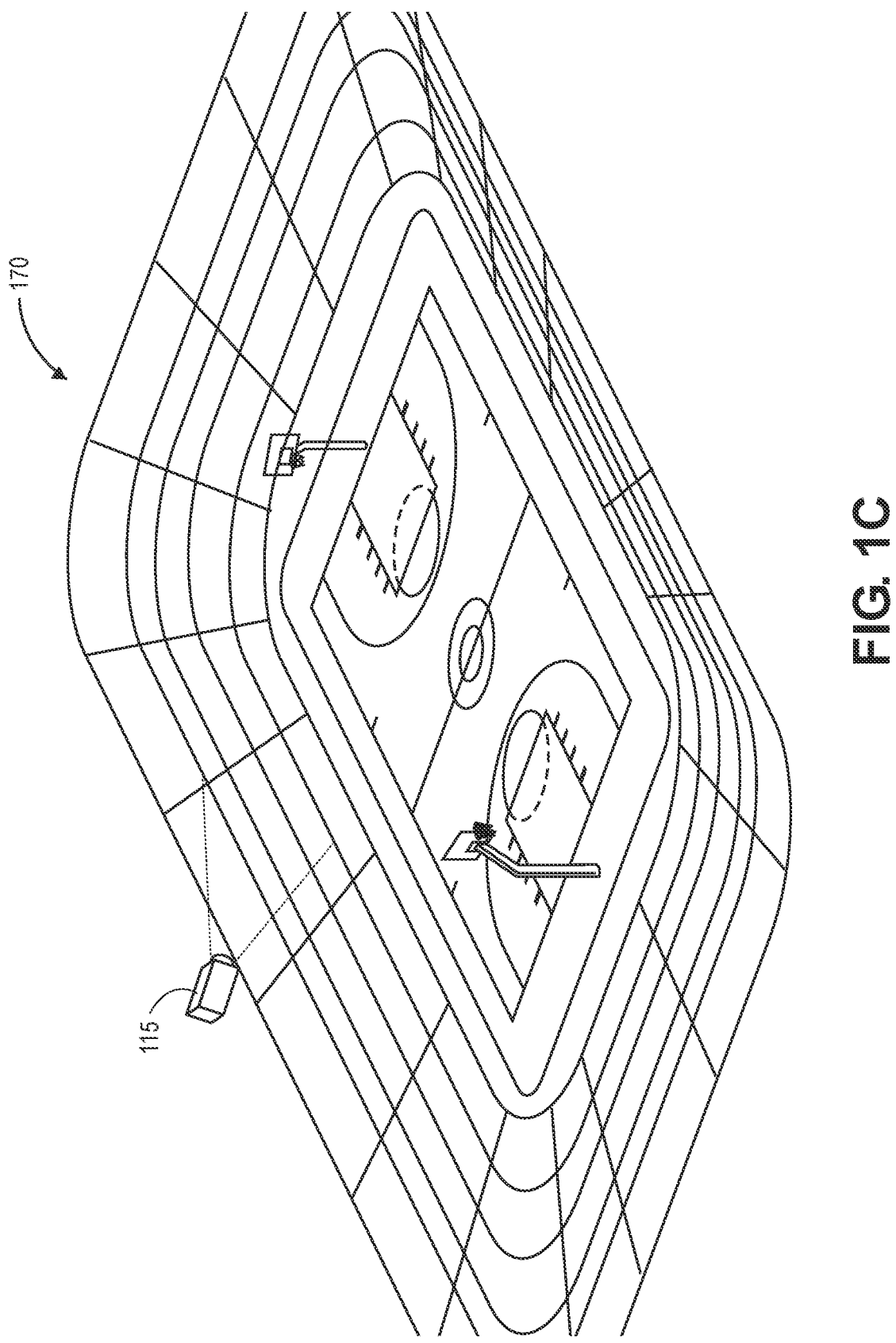

In some implementations, the systems and methods of the present disclosure may be utilized in connection with broadcasts of sporting events or other organized events. As is shown in FIG. 1C, at least one camera 115 is aligned to transmit streams of multimedia including video files and audio files captured concurrently during a live event, e.g., a basketball game, occurring at a venue 170, which may be an indoor arena, stadium, or other like facility. For example, as is shown in FIG. 1C, the camera 115 is mounted in an area of the venue 170 and aligned to capture streams of multimedia regarding activities or events occurring within a field of view that generally includes a center of a basketball court, as well as portions of the basketball court to either side of a center court line. In some implementations, the camera 115 may be carried or worn by one or more humans, mounted or placed using one or more fixed or movable systems, suspended by one or more cables, stanchions, rails or other systems, or operated using one or more electromechanical systems controlled by a human or autonomously. The venue 170 may include any number of other recording devices or systems (e.g., cameras or acoustic sensors), which may be provided in any number of other locations at or near the venue 170, and may be configured to capture multimedia streams regarding activities or events occurring within or in association with the venue 170. For example, in some implementations, recording devices for capturing video signals and recording devices for concurrently capturing audio signals may be separately provided in discrete locations at or in association with the venue 170.

Figure 1D:
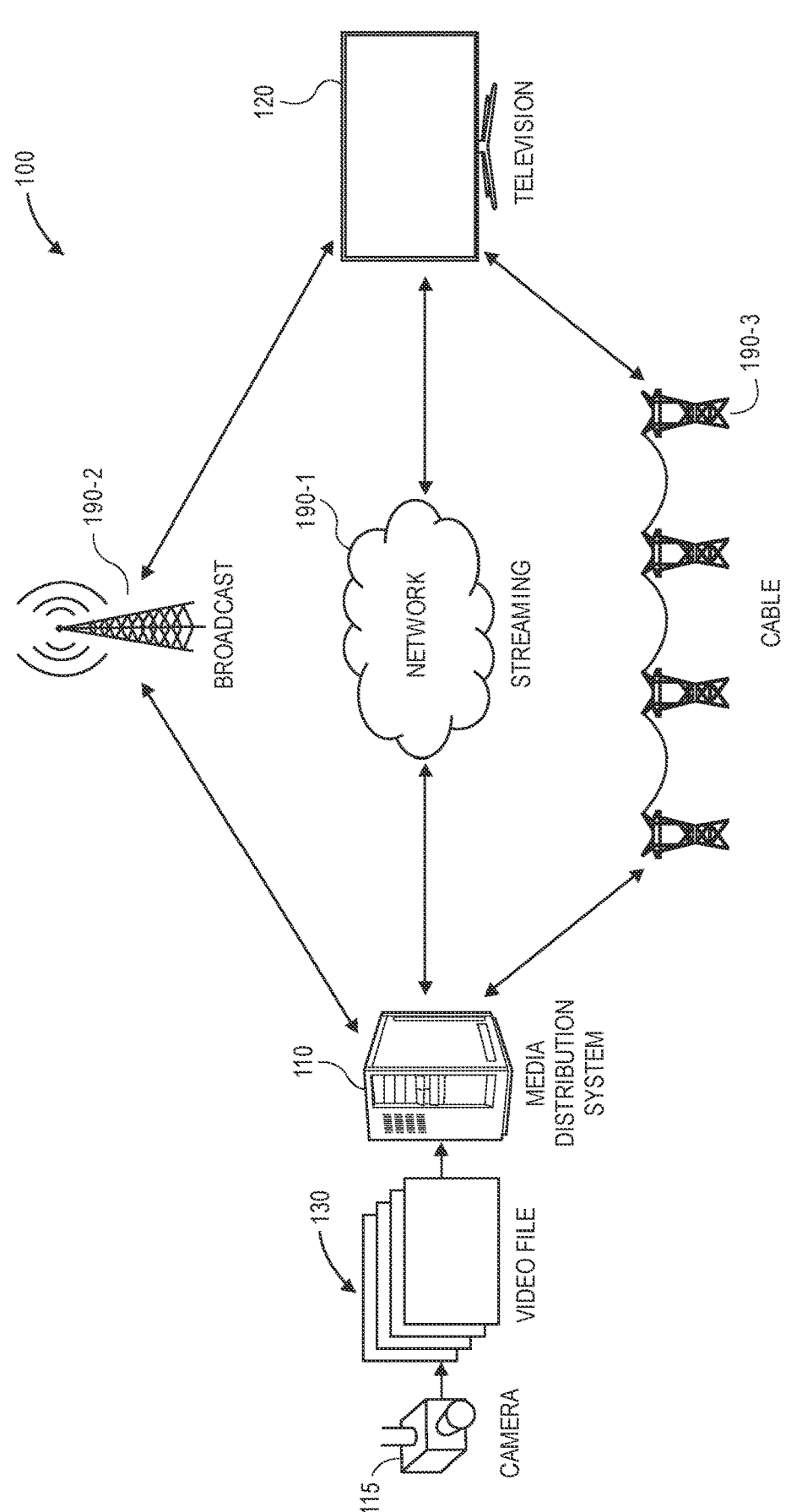

As is shown in FIG. 1D, the camera 115 may be configured to transmit multimedia streams to the media distribution system 110 and any number of televisions 120 that may be connected to one another over a plurality of communications networks 190-1, 190-2, 190-3. Such networks may include but need not be limited to a computer network 190-1 that may include the Internet in whole or in part, a broadcast television network 190-2 or a cable television network 190-3, as well as any other types or forms of communications networks (not shown), such as a cellular telephone network. The media distribution system 110 may be associated with any source or recipient of media programs including audio signals, visual content and/or associated information, data or metadata, or a system from which streams of such video files are made available to viewers over one or more of the networks 190-1, 190-2, 190-3. For example, the media distribution system 110 may be associated with an online marketplace, an entertainment company, a video streaming service (e.g., a free service or a pay service), a cable television provider, an operator of an over-the-air television channel, a social network, an outlet for news or media of any kind, or any like individual or entity. The televisions 120 may be any systems that are configured to display multimedia streams including video signals, and, optionally, one or more accompanying audio signals. Alternatively, the televisions 120 may be one or more components of a computer system or device, e.g., a smartphone, a tablet computer, a laptop computer, or any other system or device having one or more processors and a display.

The media distribution system 110 may be any source or recipient of media content, e.g., still or moving images, audio content or other multimedia, by way of a networked computer infrastructure. The media distribution system 110 may include one or more physical computer servers or data stores (e.g., databases) for hosting a network site (or network sites), or for transmitting images or other video content, sounds or other audio content, or other multimedia to devices or systems of users. For example, the media distribution system 110 may be any individual or entity associated with the broadcasting, airing, streaming or distribution of one or more video and audio files over networks, which may include the Internet in whole or in part, such as an online marketplace, an entertainment company, a video streaming service, a cable television provider, an operator of an over-the-air television station or channel, a social network, an outlet for news or media of any kind, or any like individual or entity.

The cameras 115 may capture and transmit streams of multimedia during any type or form of activities or events occurring within their respective fields of view. For example, as is shown in FIG. 1C, a field of view of the camera 115 may include any activities or events by basketball players, officials, coaches, cheerleaders, entertainment staff, or any other persons (e.g., one or more fans or other spectators).

Figure 1E:
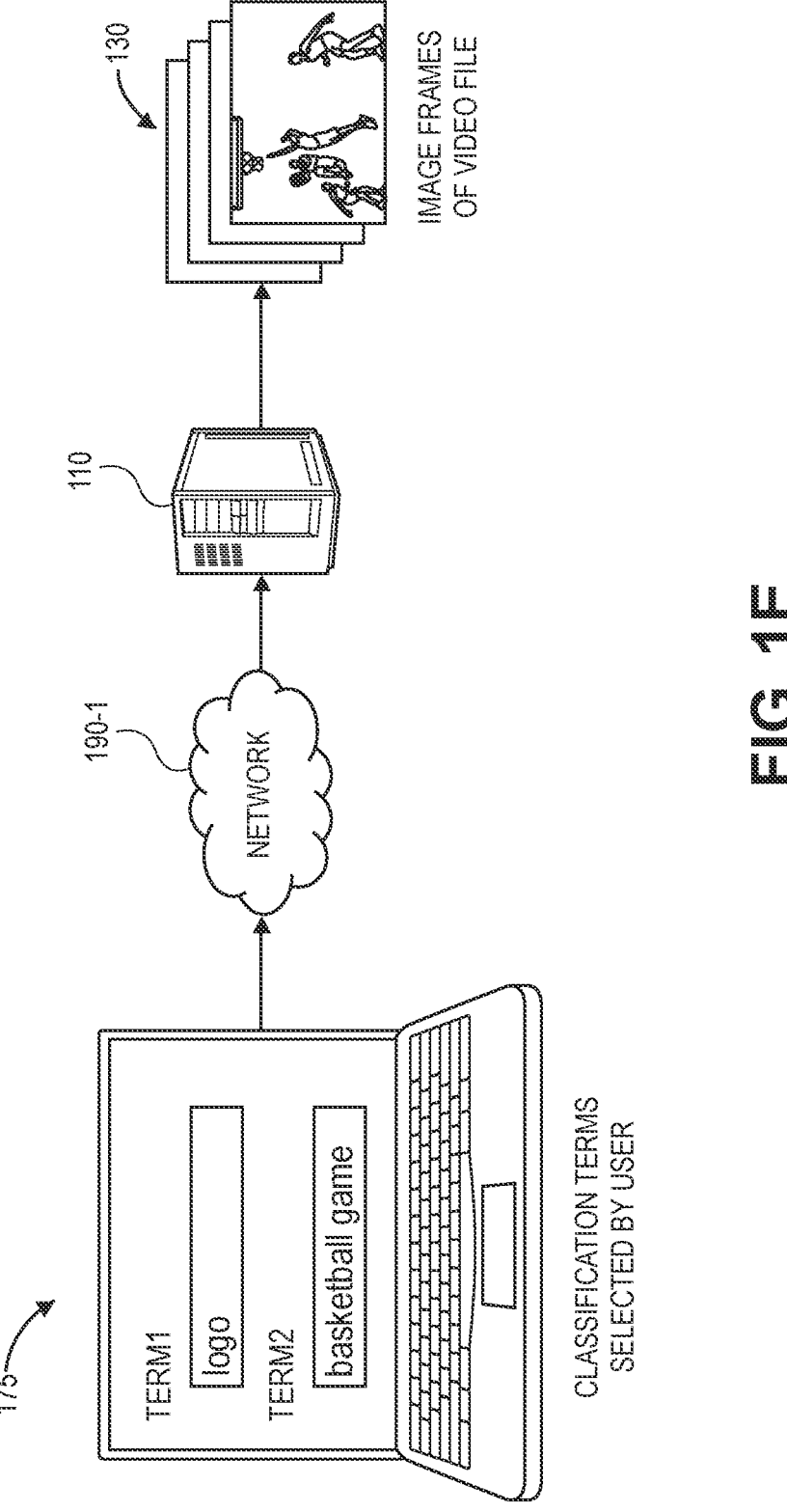

In accordance with implementations of the present disclosure, a user may identify, select or designate one or more text-based descriptors, labels or other terms representing an image to be identified within image frames of a video file. As is shown in FIG. 1E, a user may enter a pair of terms, viz., "logo" and "basketball game," into a workstation 175 in communication with the media distribution system 110 having access to the video file 130 and the image frames thereof. Alternatively, or additionally, the user may identify, select or designate one or more other parameters of a pattern of images within a video file, such as durations of relevant portions of the video file between pairs of images detected therein, or delays following detections of images therein before the relevant portions of the video file begin or end, or any other parameters that may identify or describe the pattern. The user may be an actor, a director, a participant, a producer, a viewer, or any other person associated with a broadcast of a live event, or any other individual.

The media distribution system 110 may then provide such terms to a text encoder of the pre-trained model, which generates a text embedding based on such terms. The media distribution system 110 may then further provide the image frames of the video file 130 to an image encoder of the pre-trained model, which generates image embeddings for each of the image frames of the video file 130.

Figure 1F:
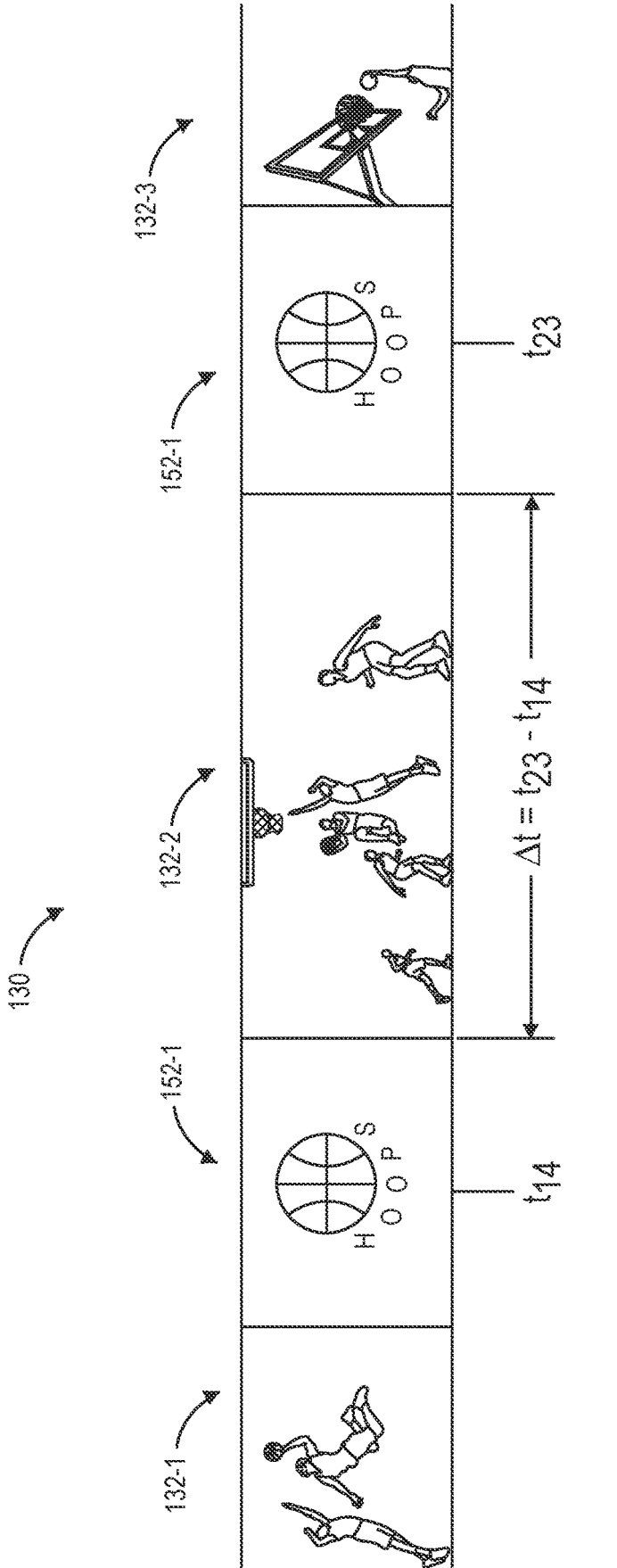

The text embedding generated based on the terms, viz., "logo" and "basketball game," is then compared to the image embeddings for each of the image frames of the video file 130. Image embeddings that are deemed most similar to the text embedding, such as where probabilities or confidence scores generated based on comparisons between such image embeddings and the text embedding exceed a predetermined threshold, may be determined to correspond to images depicting either of those terms, or logos or basketball games. The detection of images may thus be used to determine whether a pattern corresponding to a relevant portion of the video file 130, such as is shown in FIG. 1B, is present within the video file 130. As is shown in FIG. 1F, upon determining that the image 152-1, which depicts a logo, was displayed at a time $t_{14}$ following one portion 132-1 of the video file 130 and again at a time $t_{23}$ prior to another portion 132-3 of the video file 132-2, a portion 132-2 of the video file 130 displayed between the time $t_{14}$ and the time $t_{23}$, or for the duration $\Delta t$, is particularly relevant. For example, where the pattern shown in FIG. 1B is consistent with a replay during a broadcast of a sporting event at the venue 170, the portion 132-1 of the video file 130 and the portion 132-3 of the video file 130 may be understood or determined to represent activities or events in real time or near-real time, and the portion 132-2 of the video file 130 may be understood or determined to represent a replay of another activity or event that previously occurred during the broadcast. The portion 132-2 of the video file 130 may be identified as such, and stored or utilized for any purpose.

Figure 1G:
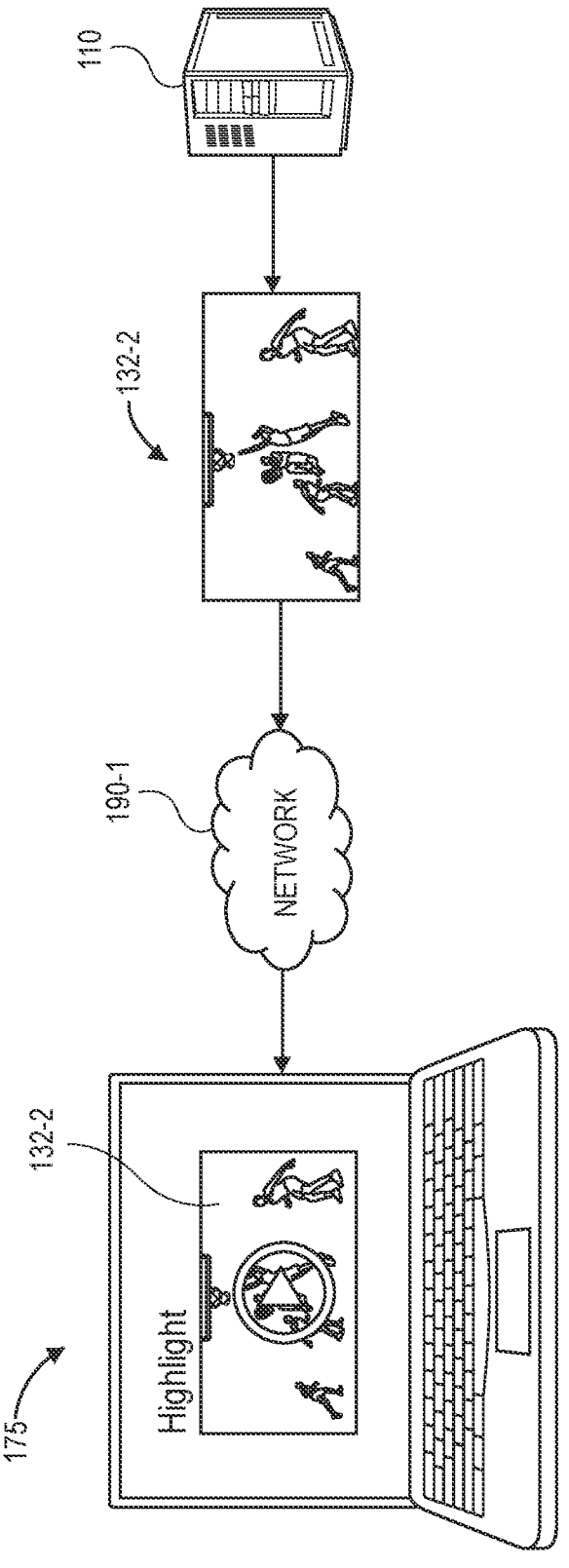

As is shown in FIG. 1G, the portion 132-2 of the video file 130 that was identified as particularly relevant based on the display of the image 152-1 at the time $t_{14}$ and the display of the image 152-1 and the time $t_{23}$ is transmitted to the workstation 175 over the one or more networks 190-1.

One or more of the functions, applications or processes described above as being performed by the media distribution system 110 or elsewhere herein as being performed by a single computer device or system may be performed by two or more computer devices or systems. For example, in some implementations, one computer system may parse, tokenize and vectorize scripts or subtitles, and determine whether portions of the scripts correspond in time to portions of the subtitles, while another computer system may distribute media programs including visual images and audio signals to devices of viewers, such as the television 120.

Figure 2:
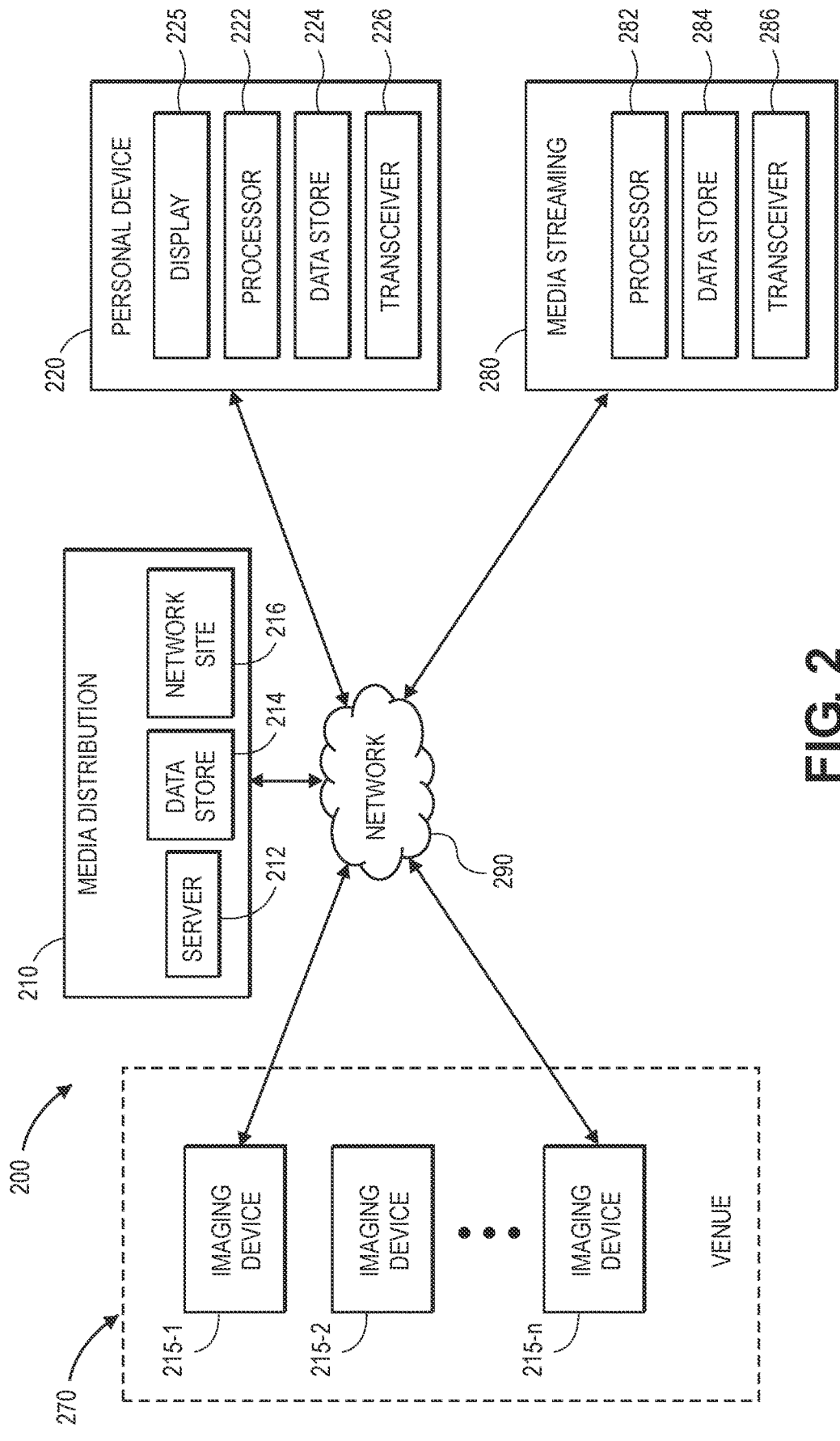
FIG. 2 is a block diagram of components of one system for detecting relevant portions of video files in accordance with implementations of the present disclosure.

Referring to FIG. 2, a block diagram of components of one system 200 for determining visual content of media programs in accordance with implementations of the present disclosure is shown. Except where otherwise noted, reference numerals preceded by the number "2" shown in FIG. 2 indicate components or features that are similar to components or features having reference numerals preceded by the number "1" shown in FIGS. 1A through 1G.

As is shown in FIG. 2, the system 200 includes a media distribution system 210, one or more imaging devices 215-1, 215-2 . . . 215-_n_ (e.g., cameras), one or more personal devices 220 and one or more media streaming devices 280 that may be connected to one another over one or more networks 290.

The media distribution system 210 may be any device, component or system for receiving and distributing digital media, e.g., still or moving images or other video content, audio content or other multimedia, by way of a networked computer infrastructure including one or more physical computer servers 212 and data stores 214 (e.g., databases) for hosting a network site 216 (or network sites). For example, the media distribution system 210 may be any individual or entity associated with the broadcasting, airing, streaming or distribution of one or more video files received from any number of imaging devices 215-1, 215-2 . . . 215-$n$ or third-party sources of information or data over the networks 290, such as an online marketplace, an entertainment company, a video streaming service, a cable television provider, an operator of an over-the-air television station or channel, a social network, an outlet for news or media of any kind, or any like individual or entity.

The media distribution system 210 may also be provided in connection with one or more physical or virtual services configured to manage or monitor digital media, as well as one or more other functions. The servers 212 may be connected to or otherwise communicate with the data stores 214 and may include one or more processors. The data stores 214 may store any type of information or data, including digital media files or any like files containing multimedia (e.g., audio and/or video content), for any purpose. The servers 212 and/or the data stores 214 may also connect to or otherwise communicate with the networks 290, through the sending and receiving of digital data.

In some implementations, the media distribution system 210 may be an Internet-based streaming content and/or media service provider. For example, the media distribution system 210 may be configured to distribute media (e.g., audio and/or video content) over the network 290 to one or more general purpose computers or computers that are dedicated to a specific purpose. The media distribution system 210 may also be configured to transmit content via a direct broadcast system, or to one or more specifically configured components such as televisions, set-top boxes or like units or components (e.g., cable boxes or converters).

For example, in some implementations, the media distribution system 210 may be associated with a television channel, network or provider of content of any type or form that is configured to transmit video files over the airwaves, via wired cable television systems, by satellite, over the Internet, or in any other manner. In some implementations, the media distribution system 210 may also be associated with any streaming video source that streams one or more video files for free or for a one-time or recurring fees. In some implementations, the media distribution system 210 may be associated with any type or form of network site (e.g., a web site), including but not limited to news sites, sports sites, cultural sites, social networks or other sites, that streams one or more video files over a network. In essence, the media distribution system 210 may be any individual or entity that makes content (e.g., audio and/or video files) of any type or form available to any other individuals or entities over one or more networks 290.

The media distribution system 210 of FIG. 2 may be independently provided for the exclusive purpose of managing the monitoring and distribution of video files or other information or data captured by the imaging devices 215-1, 215-2 . . . 215-$n$ or received from any third-party sources, such as visual imaging data and/or accompanying audio signals and metadata. Alternatively, the media distribution system 210 may be operated in connection with one or more physical or virtual services configured to manage the monitoring or distribution of such files, as well as one or more other functions. The servers 212 may be connected to or otherwise communicate with the data stores 214 and may include one or more processors, circuits or other like systems or components. The data stores 214 may store any type of information or data, including digital media files or any like files containing multimedia (e.g., audio and/or video content), for any purpose. The network sites 216 may be provided for any purpose in association with the media distribution system 210, including but not limited to the marketing of one or more video files, receiving and granting authentication requests (e.g., log-in names and/or passwords), or any other purpose. The servers 212 and/or the computer processors may also connect to or otherwise communicate with the networks 290, through the sending and receiving of digital data.

The imaging devices 215-1, 215-2 . . . 215-$n$ may comprise any form of optical recording sensor or device (or image sensor or device) provided within a venue 270 that may be used to photograph or otherwise record information or data regarding activities occurring within one or more areas or regions of the venue 270, e.g., an amphitheater, an arena, an auditorium, a ballpark, a convention center, a resort, a restaurant, a stadium, a theater, or any other facility, or for any other purpose. In some implementations, the venue 270 may be constructed or configured to host one or more sporting events, and may include one or more courts, fields, rinks or tracks within fields of view of one or more of the imaging devices 215-1, 215-2 . . . 215-$n$.

For example, the imaging devices 215-1, 215-2 . . . 215-$n$ may be configured to capture or detect reflected light if the reflected light is within fields of view of the imaging devices 215-1, 215-2 . . . 215-$n$, which are defined as functions of distances between imaging sensors and lenses within the imaging devices 215-1, 215-2 . . . 215-$n$, viz., focal lengths, as well as positions of the imaging devices 215-1, 215-2 . . . 215-$n$ and angular orientations of the lenses. Accordingly, where an object appears within a depth of field, or a distance within the field of view where the clarity and focus is sufficiently sharp, the imaging devices 215-1, 215-2 . . . 215-$n$ may capture light that is reflected off objects of any kind to a sufficiently high degree of resolution using one or more sensors thereof, and store information regarding the reflected light in one or more data files.

The imaging devices 215-1, 215-2 . . . 215-$n$ may also include manual or automatic features for modifying a field of view or orientation. For example, the imaging devices 215-1, 215-2 . . . 215-$n$ may be cameras configured in a fixed position, or with a fixed focal length (e.g., fixed-focus lenses) or angular orientation. Alternatively, the imaging devices 215-1, 215-2 . . . 215-$n$ may include one or more actuated or motorized features for adjusting a position of the imaging devices 215-1, 215-2 . . . 215-$n$, or for adjusting either the focal lengths (e.g., zooming the imaging device) or the angular orientations (e.g., the roll angle, the pitch angle or the yaw angle), by causing a change in the distance between the imaging sensor and the lens (e.g., optical zoom lenses or digital zoom lenses), for changing locations of the imaging devices 215-1, 215-2 . . . 215-$n$, or for changing one or more of angles defining angular orientations of the imaging devices 215-1, 215-2 . . . 215-$n$.

For example, the imaging devices 215-1, 215-2 . . . 215-$n$ may be hard-mounted in a fixed configuration or angle with respect to one, two or three axes. Alternatively, however, the imaging devices 215-1, 215-2 . . . 215-$n$ may be provided with one or more motors and/or controllers for manually or automatically operating one or more of the components, or for reorienting the axis or direction of the imaging devices 215-1, 215-2 . . . 215-*n*, i.e., by panning or tilting the imaging devices 215-1, 215-2 . . . 215-*n*. Panning the imaging devices 215-1, 215-2 . . . 215-*n* may cause a rotation within a horizontal plane or about a vertical axis (e.g., a yaw), while tilting the imaging devices 215-1, 215-2 . . . 215-*n* may cause a rotation within a vertical plane or about a horizontal axis (e.g., a pitch). Additionally, the imaging devices 215-1, 215-2 . . . 215-*n* may be rolled, or rotated about its axis of rotation, and within a plane that is perpendicular to the axis of rotation and substantially parallel to a field of view of the imaging devices 215-1, 215-2 . . . 215-*n*.

Imaging data (e.g., still or moving images, as well as associated audio data or metadata) captured using the imaging devices 215-1, 215-2 . . . 215-*n* may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The imaging devices 215-1, 215-2 . . . 215-*n* may further be or include one or more sound sensors (e.g., microphones, piezoelectric sensors, vibration sensors or other transducers for detecting and recording acoustic energy from one or more directions), speedometers, inclinometers, thermometers, barometers, hygrometers, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), ranging sensors (e.g., radar, sonar or LIDAR ranging sensors) or others.

The media distribution system 210 may be associated with any number of the imaging devices 215-1, 215-2 . . . 215-*n*, each of which may include any number of sensors, memory or storage components (e.g., a database or another data store), processors and any other components that may be required in order to capture, analyze and/or store imaging data or accompanying audio signals captured from within static or variable environments in which one of the imaging devices 215-1, 215-2 . . . 215-*n* is provided. For example, one or more imaging devices 215-1, 215-2 . . . 215-*n* may capture visual signals representing one or more still or moving images, along with any relevant audio signals or other information, and may also connect to or otherwise communicate with one another, or with the networks 290.

Alternatively, multimedia streams may be received from any third-party sources of media, such as a linear channel, a television station or network, a cable television provider, a streaming service, or others. Multimedia streams that are received from such sources may have been captured live by one or more cameras or other imaging devices, or otherwise obtained in any other manner, such as by purchasing or renting rights to air the media, e.g., by way of the media distribution system 210 or in any other manner, such as files over the airwaves, via wired cable television systems, by satellite, or in any other manner.

In addition to the imaging devices 215-1, 215-2 . . . 215-*n*, the media distribution system 210 may include any type or form of systems or components for receiving video files and associated audio signals or metadata, e.g., over the networks 290. For example, the media distribution system 210 may receive one or more video files via any wired or wireless means and store such video files in the one or more data stores 214 for subsequent processing, analysis and distribution. In some implementations, the media distribution system 210 may process and/or analyze video files captured by the imaging devices 215-1, 215-2 . . . 215-*n*, or received over the networks 290 from a third-party source, according to one or more detection or recognition algorithms or techniques, in order to detect or recognize one or more attributes of the visual content expressed therein, or of the audio signals accompanying such visual content. In some implementations, the media distribution system 210 may be further configured to add or assign metadata, e.g., one or more tags or virtual markings, to video files. Such metadata may indicate times or points within a video file where one or more specific activities or events, or categories of activities or events, are depicted or referenced therein, or include one or more identifiers of such activities or events. The media distribution system 210 may generate any type or form of record associated with the visual content of a video file, or the audio signals accompanying the video file, and may store such records in association with a corresponding video file or separately, e.g., in a structured form. Such records may be made available to other entities, such as the personal device 220 and/or the media streaming device 280 e.g., over the networks 290.

Additionally, the media distribution system 210 may be further configured to edit, crop, alter, modify or adjust one or more attributes of a video file. For example, where a video file is captured by any of the imaging devices 215-1, 215-2 . . . 215-*n*, or received from a third-party source over the networks 290, one or more single images, or streams of images, may be captured or otherwise obtained from the video file, and transmitted to the personal device 220 and/or the media streaming device 280. The media distribution system 210 may also be configured to compare and contrast visual content and/or audio signals or metadata regarding two or more multimedia files, and to make any number of determinations regarding the similarity or differences between such video files, audio signals or metadata. For example, the media distribution system 210 may be configured to identify attributes of one or more video frames of a video file, such as information or data regarding edges, contours, outlines, colors, textures, silhouettes, shapes or other characteristics of objects or portions thereof expressed in such video frames, e.g., according to one or more detection or recognition algorithms or techniques, and to compare such attributes to attributes of other video frames of other video files. The media distribution system 210 may also be configured to calculate one or more scores indicative of similarities or differences between such frames or such files. The media distribution system 210 may also be configured to engage in communications of any type or form with the personal device 220 and/or the media streaming device 280.

The media distribution system 210 may further broadcast, air, stream or otherwise distribute video files maintained in the data stores 214 to one or more users, via the personal devices 220 and/or the media streaming devices 280, over the networks 290. Accordingly, in addition to the server 212, the data stores 214, and the network sites 216, the media distribution system 210 may also include any number of components associated with the broadcasting, airing, streaming or distribution of such files, including but not limited to transmitters, receivers, antennas, cabling, satellites, or communications systems of any type or form. Processes for broadcasting, airing, streaming and distribution of video files over various networks are well known to those skilled in the art of communications and thus, need not be described in more detail herein.

For example, in some implementations, the media distribution system 210 may also receive or access one or more records of information, data or metadata regarding preferences of a given user, or of users similarly situated to the user or otherwise having one or more attributes in common with the user, as well as any information, data or metadata regarding one or more contexts or events, instances or occurrences of particular relevance in association with a specific time or location. Based on such information, data or metadata, the media distribution system 210 may identify media content (e.g., audio and/or video content) to be presented to a user in association with one or more applications or content sources, including but not limited to media content to be promoted to the user, or contextual or supplemental content to be displayed to the user in association with the applications or content sources. The media distribution system 210 may further generate media files including such content, or modify one or more existing media files to include such content, and transfer such video files to the personal device 220 or the media streaming device 280 over the networks 290 or by any other means. Additionally, the media distribution system 210 may further engage in communications of any type or form with the personal devices 220 and/or the media streaming devices 280.

The personal device 220 may be any peripheral output device capable of receiving and displaying or otherwise outputting any content. The personal device 220 may be associated with any user (e.g., an individual or entity), and may be a general purpose or a special purpose device for viewing content and/or communicating with other computer devices over the networks 290. For example, the personal device 220 may be a television of any type or form, as well as any type of networked computer device (e.g., a personal digital assistant, a digital media player, a smartphone, a web pad, an electronic book reader, a desktop computer, a laptop computer or a tablet computer, as well as a wearable computer device such as a pair of augmented reality glasses or a wristwatch, or a computer device that may be incorporated into one or more vehicles or appliances) or any other like machine that may operate or access one or more software applications, or communicate with the media streaming device 280, and may be configured to render content on one or more displays or to interact with such content.

The personal device 220 may include a display (or screen) 225, a processor 222, a data store 224 and/or a transceiver 226. The display 225 may be a television system, a monitor or any other like machine having a screen for viewing rendered video content. For example, the display 225 may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electrome-chanical systems (or "MEMS"), spatial light modulators, electroluminescent displays, quantum dot displays, liquid crystal on silicon (or "LCOS") displays, cholesteric displays, interferometric displays or others. The display 225 may be configured to receive content from any number of sources via one or more wired or wireless connections, including but not limited to the media distribution system 210 or the media streaming devices 280 over the networks 290.

The processor 222 may be configured to perform any type or form of computing function associated with the operation of the personal device 220, including but not limited to the execution of one or more machine learning tools, algorithms or techniques. The processor 222 may also be configured to execute any other algorithms or techniques (e.g., object detection or recognition algorithms or techniques) associated with one or more applications, purposes or functions, and may communicate with the media distribution system 210, the media streaming system 280, or any other external computing devices or machines over the network, through the sending and receiving of digital data.

The processor 222 may be a uniprocessor system including one processor, or a multiprocessor system including several processors (e.g., two, four, eight, or another suitable number), and may be capable of executing instructions. For example, in some implementations, the processor 222 may be a general-purpose or embedded processor unit such as a CPU or a GPU having any number of instruction set architectures (ISAs), such as the x86, PowerPC, SPARC, or MIPS ISAs, or any other suitable ISA. Where the processor 222 is a multiprocessor system, each of the processors within the multiprocessor system may operate the same ISA, or different ISAs. The processors 222 may be configured to operate one or more software applications, e.g., a browser, a viewing application operating one or more codecs, and/or a shopping application, and render content to the display 225 via one or more user interfaces. The processor 222 may execute one or more computer-based instructions that may be stored in the data store 224, along with one or more video files or operating programs or instructions.

The personal device 220 further includes one or more data stores (e.g., memory or storage components) 224 for storing any type of information or data, e.g., content received over the network 290, or any associated information, data or metadata. The personal device 220 also includes the transceiver 226, which may be configured to enable the personal device 220 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly.

The transceivers 226 may be configured to communicate over one or more of the networks 290, such as by receiving and interpreting broadcast signals, cable television signals, computer signals, cellular telephone signals or any other type or form of signals, and responding in kind with any number of corresponding or reciprocal signals. The transceiver 226 may further include or be in communication with one or more input/output (or "I/O") interfaces, network interfaces and/or input/output devices, and may be configured to allow information or data to be exchanged between one or more of the components of the personal device 220, or to one or more other computer devices or systems via the network 290. For example, in some implementations, the transceiver 226 may be configured to coordinate I/O traffic between the processor 222 and one or more external computer devices or components, and may perform any necessary protocol, timing or other data transformations in order to convert data signals from a first format suitable for use by one component into a second format suitable for use by another component. In some implementations, the transceiver 226 may include support for devices attached through various types of peripheral buses, e.g., variants of the Peripheral Component Interconnect (PCI) bus standard or the Universal Serial Bus (USB) standard. In some other implementations, functions of the transceiver 226 may be split into two or more separate components, or integrated with the processor 222.

The media streaming device 280 may also be any type of device or devices capable of outputting visual and/or audible content, e.g., from the media distribution system 210 or any other sources of such content, and providing such content to the personal device 220 according to any protocols and by any wired or wireless techniques, e.g., a high-definition multimedia interface (HDMI) protocol, such as a Consumer Electronics Control (CEC) protocol. The media streaming device 280 includes a processor 282, a data store 284 and a transceiver 286, which may share one or more attributes, features or functions in common with the processor 222, the data store 224 or the transceiver 226, respectively, or may have one or more attributes, features or functions that are different from those of the processor 222, the data store 224 or the transceiver 226 of the personal device 220. In some implementations, the media streaming device 280 may also be capable of communicating with and controlling the personal device 220, e.g., to turn the personal device 220 on or off, to select an input source for the personal device 220, to adjust a volume of the personal device 220, or to otherwise control any other functions of the personal device 220.

Those of ordinary skill in the pertinent arts will recognize that the personal device 220 or the media streaming device 280 may include any number of hardware components or operate any number of software applications for receiving and rendering content received from the media distribution system 210 or other sources.

Moreover, those of ordinary skill in the pertinent arts will further recognize that, alternatively, in some implementations, the personal device 220 or the media streaming device 280 need not be associated with a given user. For example, the personal device 220 or the media streaming device 280 may be provided in a public place, beyond the control of any one user, e.g., a television provided in a bar, restaurant, transit station, or shopping center, or an electronic billboard provided in a population center or along a transit line, where any individuals may view and/or interact with video content rendered on the display 225.

Although the system 200 shown in FIG. 2 shows boxes for one media distribution system 210, three imaging devices 215-1, 215-2 . . . 215-n, one personal device 220, one media streaming device 280 and one network 290, those of ordinary skill in the pertinent arts will recognize that any number of media distribution systems 210, imaging devices 215-1, 215-2 . . . 215-n, personal devices 220, media streaming devices 280 or networks 290 may be considered in accordance with the present disclosure. For example, multiple users may access, view and interact with content provided by multiple media distribution systems 210 (e.g., television channels or networks, marketplaces, social networks and any other content providers or sites), via multiple personal devices 220 or media streaming devices 280, and such content may include multiple types or forms of media provided by multiple content sources. Moreover, the personal devices 220 or the media streaming devices 280 with which users interact to access, view and interact with content may include all or fewer of the components shown in FIG. 2 or perform all or fewer of the functions described herein. For example, a user may view content on one personal device 220 or via one media streaming device 280, and execute interactions relating to that content on another personal device 220 or another media streaming device 280, using a remote control, a smartphone, a smart speaker, a smart wristwatch, or the like.

The network 290 may be any wired network, wireless network, or combination thereof, and may comprise the Internet, intranets, broadcast networks, cellular television networks, cellular telephone networks, satellite networks, or any other networks, in whole or in part. In addition, the network 290 may be a personal area network, local area network, wide area network, cable network, satellite network, cellular telephone network, or combination thereof, in whole or in part. The network 290 may also be a publicly accessible network of linked networks, possibly operated by various distinct parties, such as the Internet. In some implementations, video files may be provided by the media distribution system 210 to the personal device 220 or the media streaming device 280 over multiple networks 290. For example, a video file may be broadcast over the air or via satellite to a cable television provider, before being transmitted by the satellite or the provider to a receiver associated with the personal device 220, and shown on the display 225 and/or recorded in the data store 224. Alternatively, video files may be transmitted over a traditional computer network, such as the Internet, prior to reaching the personal device 220. In some implementations, the network 290 may include a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The server 212 and the personal device 220, and associated components, may use any web-enabled or Internet applications or features, or any other client-server applications or features, to connect to the networks 290, or to communicate with one another, such as through short or multimedia messaging service (SMS or MMS) text messages. For example, the server 212, the personal device 220 and the media streaming device 280 may be configured to transmit information or data in the form of synchronous or asynchronous messages to one another in real time or in near-real time, or in one or more offline processes, via the networks 290. Those of ordinary skill in the pertinent arts would recognize that the imaging devices 215-1, 215-2 . . . 215-n, the server 212, the personal device 220 and the media streaming device 280 may include or operate any of a number of computing devices that are capable of communicating over the networks 290. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the imaging devices 215-1, 215-2 . . . 215-n, the server 212, the processor 222, or the processor 282, or to any other computers or control systems utilized by the media distribution system 210, the personal device 220, or the media streaming device 280, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

As used herein, the terms "image," "video," "video file," "video program," or like terms, may refer to files comprising one or more images or video frames that are configured for broadcasting, airing, streaming or distributing in any manner, such as over any number of networks, or in a hard storage format (e.g., a DVD, a stick drive or another physically portable format). As used herein, the terms "sounds," "audio," "audio file," "audio program," or like terms, may refer to files comprising one or more sounds or other acoustic signals that are also configured for broadcasting, airing, streaming or distributing in any manner, such as over any number of networks, or in a hard storage format. As used herein, the terms "program," "content," "media" or "multimedia" may refer to video files and audio files that may be concurrently presented by one or more of a personal device directly, or by a personal device via a media streaming device, and may include but are not limited to information, data or metadata including or relating to such video files and audio files.

Figure 3:
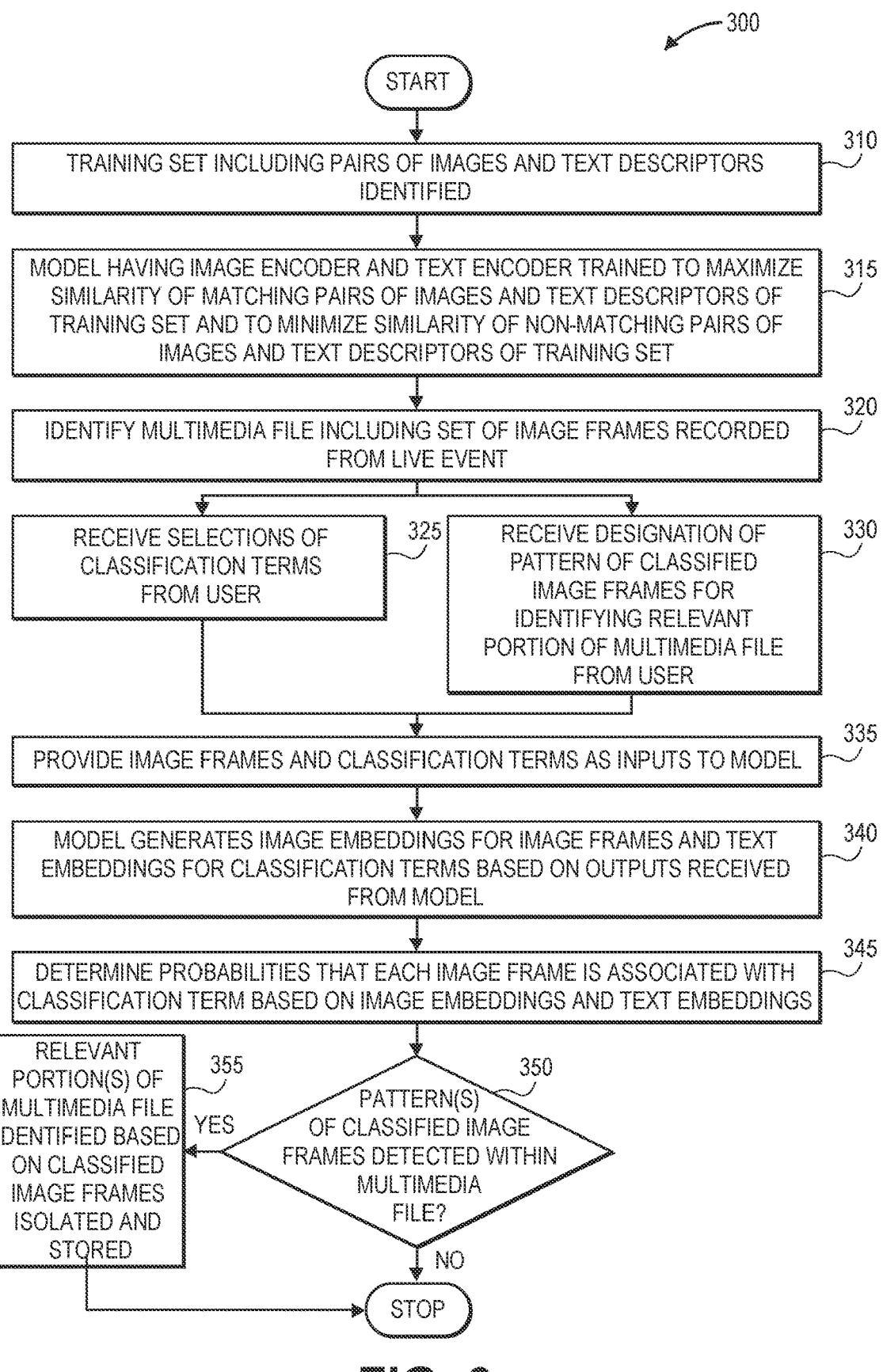
FIG. 3 is a flow chart of one process for detecting relevant portions of video files in accordance with implementations of the present disclosure.

Referring to FIG. 3, a flow chart 300 of one process for detecting relevant portions of video files in accordance with implementations of the present disclosure is shown.

At box 310, a training set including pairs of images and text descriptors is identified. For example, the training set may include any number of images depicting one or more objects, as well as sets of text that describe such objects, e.g., labels or identifiers of the objects. The images of the training set may have any level of quality or resolution. For example, the images may have been captured by any type of camera or other imaging device at any level of resolution, such as 1280×720, 1920×1080, 3840×2160, or others, or streamed at any bitrate, which may range from 1,200 kilobits per second to 14,000 kilobits per second, or others, and according to any formats or protocols, e.g., HTTP Live Streaming ("HLS"), Real-Time Messaging Protocol ("RTMP"), Secure Reliable Transport ("SRT"), Dynamic Adaptive Streaming over HTTP ("MPEG-DASH"), WebRTC, or others.

The text descriptors of the image may be determined in any manner, as well. In some implementations, the text descriptors may be generated by a human operator who views or evaluates contents of such images, and selects one or more words to describe contents of such images. Alternatively, in some implementations, the images may be identified from one or more external resources, such as network pages or sites (e.g., web pages or web sites), and the text descriptors may be obtained or derived from alternate text labels stored in association with such images, such as in code for rendering the images within the network pages or sites. In some other implementations, the images may be obtained from broadcasts of live events or other video files, e.g., as still images or other representations, and the text descriptors may be identified from audio signals including spoken words that are transcribed and associated with the images. For example, where a broadcast of a golf tournament depicts a golfer attempting to putt a ball into a cup, an image of the golfer may be stored in association with words spoken by an announcer or the golfer at a time of the attempted putt. Such words may be transcribed into text in real time or in near-real time, e.g., for use in captions transmitted along with images and audio signals during the broadcasts, or at any other time by manual or automatic techniques. Images may be stored in association with text descriptors in any manner and in any location, e.g., in one or more alternate or virtual locations, such as in a "cloud"-based environment.

At box 315, a model having an image encoder and a text encoder is trained to maximize the similarity of matching pairs of the images and the text descriptors of the training set and to minimize the similarity of non-matching pairs of the images and the text descriptors of the training set.

For example, in some implementations, the model may be an artificial neural network that trains the image encoder and the text encoder, e.g., by contrastive learning, to generate image embeddings and text embeddings, respectively, having the same latent space.

The model may be trained to maximize cosine similarities between image embeddings generated for images of pairs and text embeddings generated for text descriptors of the pairs, and to minimize cosine similarities between the image embeddings and for text embeddings generated for text descriptors of other images, e.g., images not of the same pairs as the text descriptors. In some implementations, the image encoder may be a visual transformer. In some implementations, the text encoder may be a text transformer.

At box 320, a multimedia file including a set of image frames recorded from a live event is identified. The live event may be any organized event during which video signals and audio signals are captured and broadcast live to one or more viewers or listeners in the same location, or in other locations. The multimedia file may include both video signals (e.g., the image frames) and audio signals (e.g., sounds accompanying the image frames, which may be captured concurrently with the image frames), and may be identified in real time or near-real time, or at any other time with respect to the broadcast of the live event.

For example, in some implementations, the multimedia file and the sets of image frames may depict a sporting event, such as a baseball game, a basketball game, a football game, a golf match or tournament, a hockey game, a soccer game, a tennis match, or any other organized event. Alternatively, the live event may be a news broadcast, a parade, a performance such as a play or a concert, a public meeting, a social gathering, or any other event during which video signals and audio signals may be captured and broadcast to viewers or listeners.

At box 325, selections of classification terms are received from a user. For example, the user may identify terms representing categories of images or objects depicted therein, to any degree or level of specificity. The classification terms may be selected on any basis, and may relate to a task or a purpose for which portions of the multimedia file are desired or intended, or to any attribute or aspect of the live event. The user may be an actor, a director, a participant, a producer, a viewer, or any other person associated with the live event, any other individual or entity.

In parallel, at box 330, a designation of a pattern of classified image frames for identifying relevant portions of the multimedia file is also received from the user. For example, the designation may identify one or more of the classification terms, and indicate portions of the multimedia file with respect to images corresponding to the classification terms that are to be selected or identified.

The pattern of classified image frames may reference detected image frames of various classifications that are displayed to viewers at regular times. One pattern may include a display of an image frame having a first classification at a first time, and a display of an image frame having a second classification at a second time, wherein the first time and the second time are separated by a predetermined duration, or a duration within a range of one or more limits, e.g., within a range of five to twenty seconds. Such a pattern may further define a relevant portion to include image frames displayed between the first time and the second time, or at any other time with respect to the first time or the second time. In some implementations, the image frames may have the same classification. Alternatively, another pattern may be defined by displays of any number of image frames having any number of classifications, and at any times, during a broadcast of a live event, and a relevant portion of the multimedia file may be defined to include image frames displayed at any other time with respect to such times.

In some implementations, the pattern may be used to identify portions of a multimedia file located between images corresponding to the classification terms that are detected within the multimedia file as relevant. The designation of the pattern may indicate a length or range of minimum and maximum durations of time between the detected images, such as is shown in FIG. 1B, and indicate that portions of the multimedia file between the detected images and within the length or range are deemed relevant. In some other implementations, the pattern may be used to identify portions of a multimedia file located with respect to images corresponding to one of the classification terms that is detected within the multimedia file as relevant. The designation of the pattern may indicate that a portion of the multimedia file that precedes or follows a detected image, and has a predetermined duration of time, is deemed relevant.

The pattern may be associated with any aspect or attribute of the broadcast or the live event. For example, where the live event is a baseball game, the pattern may represent or correspond to a display of an advertisement during the baseball game, or a highlight of one or more preceding activities or events that occurred during the baseball game. Alternatively, the pattern may represent a discrete activity or event occurring during a live event, e.g., a particular type or style of play, such as a home run, a touchdown, a three-point basket, or any other activity or event. For example, where an image of an object or a symbol corresponding to a discrete event is known to be displayed during the discrete activity or event, or within a predetermined period of time following the discrete activity or event, the pattern may be defined by the display of the object or symbol, and other images during a preceding or following period of time.

For example, portions of the multimedia file that fall between detected images, or are identified with respect to detected images, or are otherwise identified with respect to a pattern in any other manner, may represent replays of an activity or event that occurred prior to the transmission of such portions, interviews with persons associated with the live event, or any other content.

At box 335, the set of image frames and the classification terms are provided as inputs to the model trained at box 315. At box 340, the model generates image embeddings for the image frames of the multimedia file and text embeddings for the classification terms received from the user at box 325 based on outputs received from the model in response to the inputs. The image embeddings and the text embeddings may be vectors or other sets of data within the same latent space, and may have any size or number of values.

At box 345, probabilities that each of the image frames of the set is associated with each of the classification terms are calculated based on the image embeddings and the text embeddings generated at box 340. For example, each of the image frames may be referenced by a time stamp or another identifier, and probabilities that the image frames depict an object consistent with one of the classification terms may be calculated from the respective embeddings. The probabilities may be calculated in any manner, such as based on cosine similarities between each of the image embeddings generated by the image encoder upon providing the set of image frames as inputs to the model, and each of the text embeddings generated by the text encoder upon providing the set of classification terms to the model. Where one of the classification terms represents a background class, a sum of the probabilities calculated at box 345 for each of the image frames may equal one.

At box 350, whether the one or more patterns of the classified image frames designated by the user at box 330 are detected within the multimedia file is determined. For example, where probabilities that image frames of a pattern are detected within the multimedia file are sufficiently high, as determined based on the image embeddings and the text embeddings, and such image frames are displayed at times or in sequences consistent with the pattern, the pattern may be determined to be present within the multimedia file. If none of the patterns of the classified image frames designated by the user at box 330 are detected within the multimedia file, the process ends.

If any of the patterns of the classified image frames designated by the user at box 330 are detected within the multimedia file, however, then the process advances to box 355, where the portions of the multimedia file identified based on the classified image frames in accordance with the pattern are isolated and stored in one or more data stores, and the process ends. For example, where a pattern is defined to include a display of a first image of a first classification at a first time, and a display of a second image of a second classification at a second time, with the second time being separated by or within a duration of a predetermined length or range, a relevant portion may be identified as including image frames displayed between the first time and the second time. In some implementations, a broadcast of a live event may designate or delineate that a replay of an activity or an event that previously occurred during the live event will be framed by a pair of images depicting objects or symbols, e.g., prior to and following the replay, and a portion of the multimedia file identified in this manner may be determined to constitute a replay.

The process represented in the flow chart 300 may be performed at any number of times or for any number of instances, such as once for each of the patterns designated by the user at box 330. Moreover, once a relevant portion of a broadcast of a live event is identified according to the present invention, the relevant portion may be utilized for any purpose. For example, in some implementations, where the relevant portion is a highlight of the live event, or an activity or event of the broadcast of the live event having some level of significance, the relevant portion may be transmitted separately or together with one or more of such other portions, e.g., in a summary of the broadcast of the live event, to personal devices of any number of other viewers in news programs or other multimedia. Alternatively, in some implementations, the relevant portion may be excluded from a summary of the broadcast of the live event. For example, where the relevant portion is a set of commercials or other advertisements that are displayed during a broadcast of a live event and are framed by the display of images at predetermined times prior to or following the advertisements, a modified version of the broadcast of the live event that excludes the advertisements may be generated, e.g., by detecting patterns of the images and identifying the advertisements with respect to the patterns, and generating a summary that does not include such advertisements.

As is discussed above, a pattern of image frames displayed during a broadcast of a live event may be defined to include any number of image frames displayed at any time with respect to one another, and a relevant portion of the broadcast of the live event may be identified with respect to the pattern in any manner.

Figure 4A:
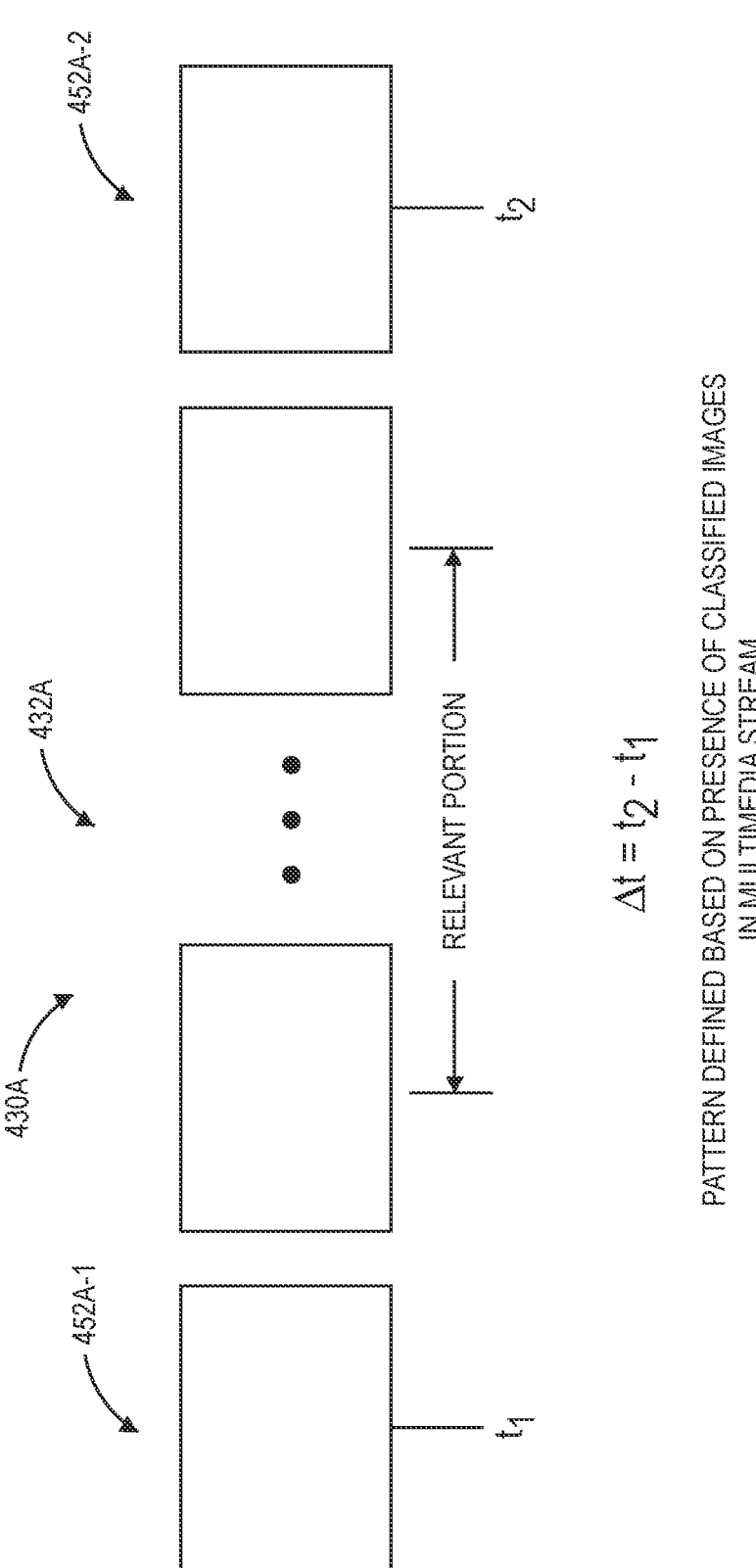
FIGS. 4A and 4B are views of aspects of one system for detecting relevant portions of video files in accordance with implementations of the present disclosure.
Figure 4B:
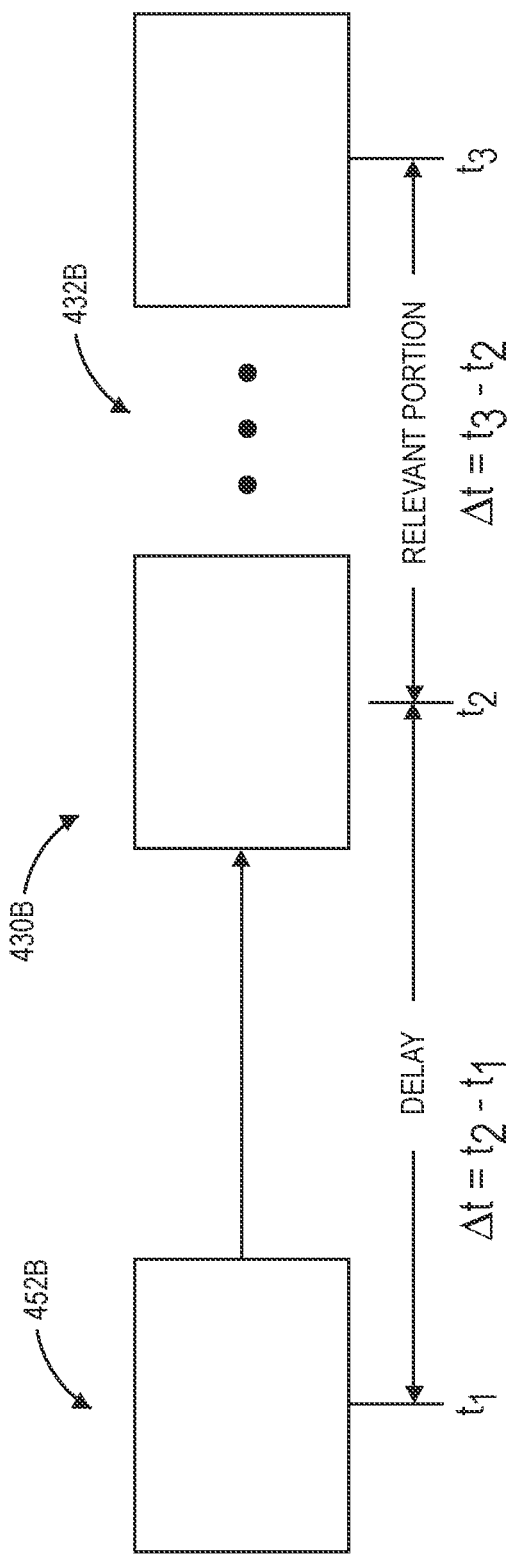

Referring to FIGS. 4A and 4B, views of aspects of one system for detecting relevant portions of video files in accordance with implementations of the present disclosure are shown. Except where otherwise noted, reference numerals preceded by the number "4" shown in FIG. 4A or FIG. 4B indicate components or features that are similar to components or features having reference numerals preceded by the number "2" shown in FIG. 2 or by the number "1" shown in FIGS. 1A through 1G.

As is shown in FIG. 4A, a pattern of image frames may be defined to include a first image frame 452A-1 and a second image frame 452A-2. A relevant portion 432A of a video file 430A is displayed between a display of the first image frame 452A-1 at a first time $t_1$ and a display of the second image frame 452A-2 at a second time $t_2$, where a difference between the second time $t_2$ and the first time $t_1$, or $\Delta t$, is not greater than a predetermined threshold. In accordance with implementations of the present disclosure, where a user (e.g., an actor, a director, a participant, a producer, a viewer, or any other individual or entity) provides classification terms consistent with the first image frame 452A-1 and the second image frame 452A-2 and defines parameters of the pattern of FIG. 4A, e.g., the predetermined threshold that the difference $\Delta t$ may not exceed, the relevant portion 432A may be identified where image embeddings generated based on the image frames of the video file 430A are sufficiently similar to text embeddings generated based on the classification terms, such as where probabilities or confidence scores calculated for such image embeddings and such text embeddings are sufficiently high, and where times at which each of the first image frame 452A-1 and the second image frame 452A-2 are displayed, viz., the first time $t_1$ and the second time $t_2$, are not separated by more than the predetermined threshold. The relevant portion 432A may include not only the image frames 432A between the image frame 452A-1 and the image frame 452A-2 but also any audio signals that accompanied the image frames 432A.

As is shown in FIG. 4B, a pattern of image frames may be defined based on a display of an image frame 452B, and a duration of time following the display of the image frame 452B, which may be identified where image embeddings generated based on the image files of the video file 430B are sufficiently similar to text embeddings generated based on classification terms, such as where probabilities or confidence scores calculated for such image embeddings and text embeddings are sufficiently high. Following a display of the image frame 452B at a time $t_1$, a relevant portion 432B of a video file 430B displayed between a time $t_2$ and a time $t_3$ may be designated in a pattern that specifies the image frame 452B, a delay following a display of the of the image frame 452B, viz., $\Delta t = t_2 - t_1$, and a duration of time, viz., $\Delta t = t_3 - t_2$.

In accordance with implementations of the present disclosure, where a user provides classification terms consistent with the image frame 452B and defines parameters of the pattern of FIG. 4B, e.g., the delay and the duration, the relevant portion 432B may be identified where an image embedding generated based on one of the image frames of the video file 430B is sufficiently similar to a text embedding generated based on a classification term for the image frame 452B. The relevant portion 432B may begin following the delay, viz., $\Delta t = t_2 - t_1$, and may last for the duration, viz., $\Delta t = t_3 - t_2$. The relevant portion 432B may include not only the image frames 432B displayed at the delay following the image frame 452B and lasting for the duration, but also any audio signals that accompanied the image frames 432B.

A pattern of image frames may be designated by a user based on classification terms and used to identify relevant portions of a video file accordingly. Referring to FIGS. 5A through 5D, views of aspects of one system for detecting relevant portions of video files in accordance with implementations of the present disclosure are shown. Except where otherwise noted, reference numerals preceded by the number "5" shown in FIGS. 5A through 5D indicate components or features that are similar to components or features having reference numerals preceded by the number "4" shown in FIGS. 4A and 4B, by the number "2" shown in FIG. 2 or by the number "1" shown in FIGS. 1A through 1G.

Figure 5A:
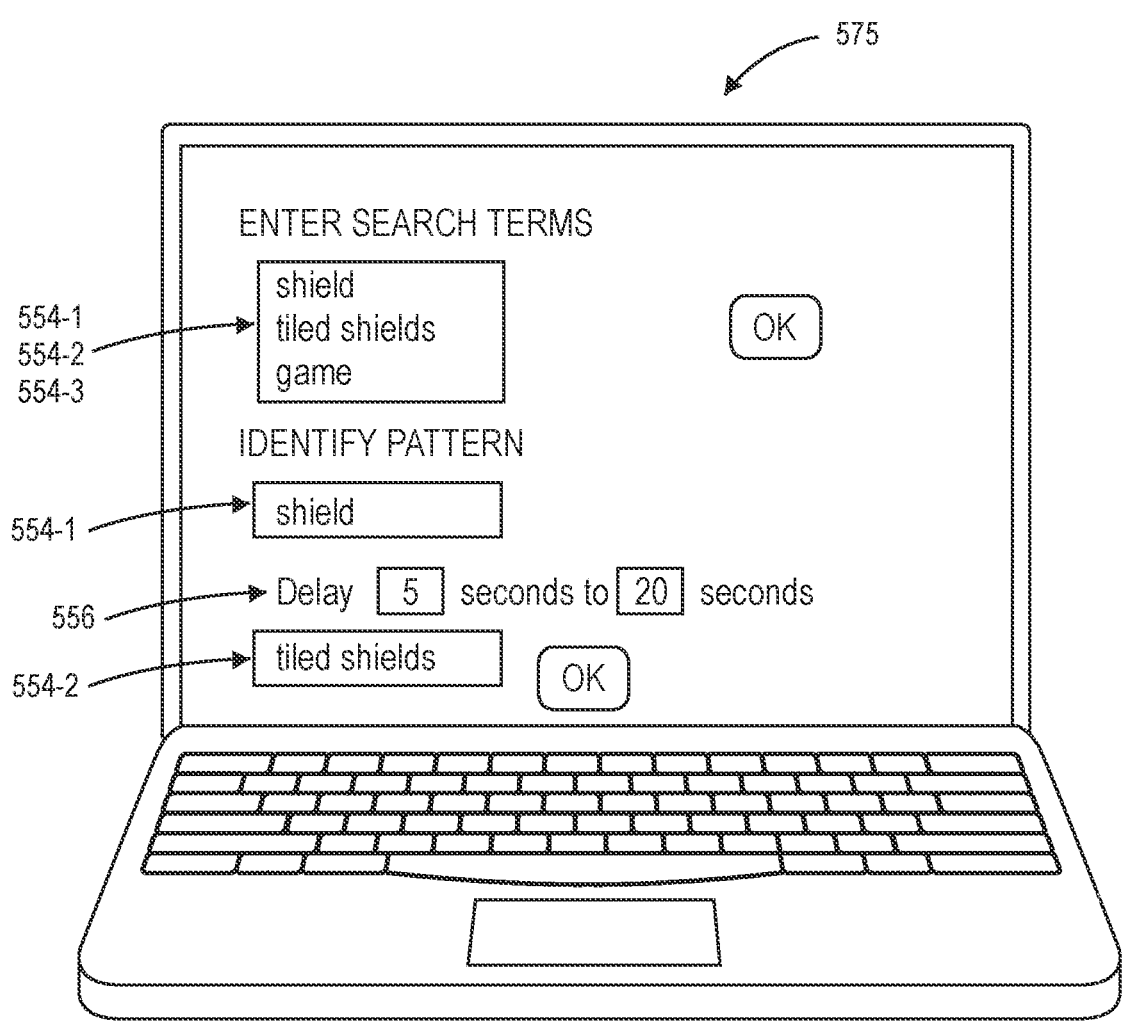
FIGS. 5A through 5D are views of aspects of one system for detecting relevant portions of video files in accordance with implementations of the present disclosure.

As is shown in FIG. 5A, a user of a workstation 575 may designate a number of classification terms 554-1, 554-2, 554-3, viz., "shield," "tiled shields," and "game," and specify that a pattern includes displays of images consistent with the classification term 554-1, viz., "shield," and images consistent with the classification term 554-2, viz., "tiled shields," separated by a duration 556 of five to twenty seconds. The user of the workstation 575 may be an actor, a director, a participant, a producer, a viewer, or any other person associated with a live event, or any other individual or entity.

Figure 5B:
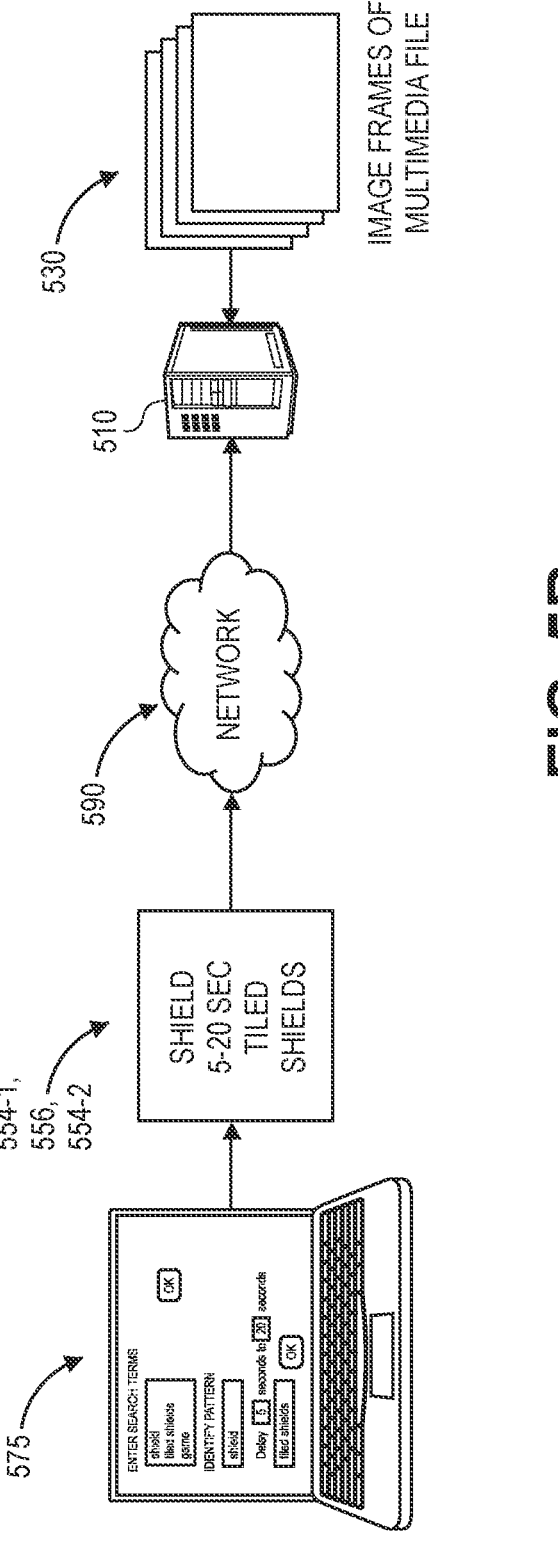

As is shown in FIG. 5B, the workstation 575 may transmit information regarding the pattern, including the classification terms 554-1, 554-2 and the duration 556 between images consistent with the classification terms 554-1, 554-2, to a server 510 having access to a multimedia file 530. Alternatively, or additionally, the workstation 575 may further transmit information regarding other classification terms, viz., the classification term 554-3, to the server 510. In some implementations, the server 510 may be associated with a media distribution system. Alternatively, the server 510 may be separate or distinct from any system for broadcasting, airing, streaming or distribution of multimedia. In some implementations, the multimedia file 530 may include any number of image frames that were transmitted to viewers during a broadcast of a live event. In some other implementations however, the multimedia file 530 may also include one or more sets of audio signals that accompanied the image frames during the broadcast of the live event.

Figure 5C:
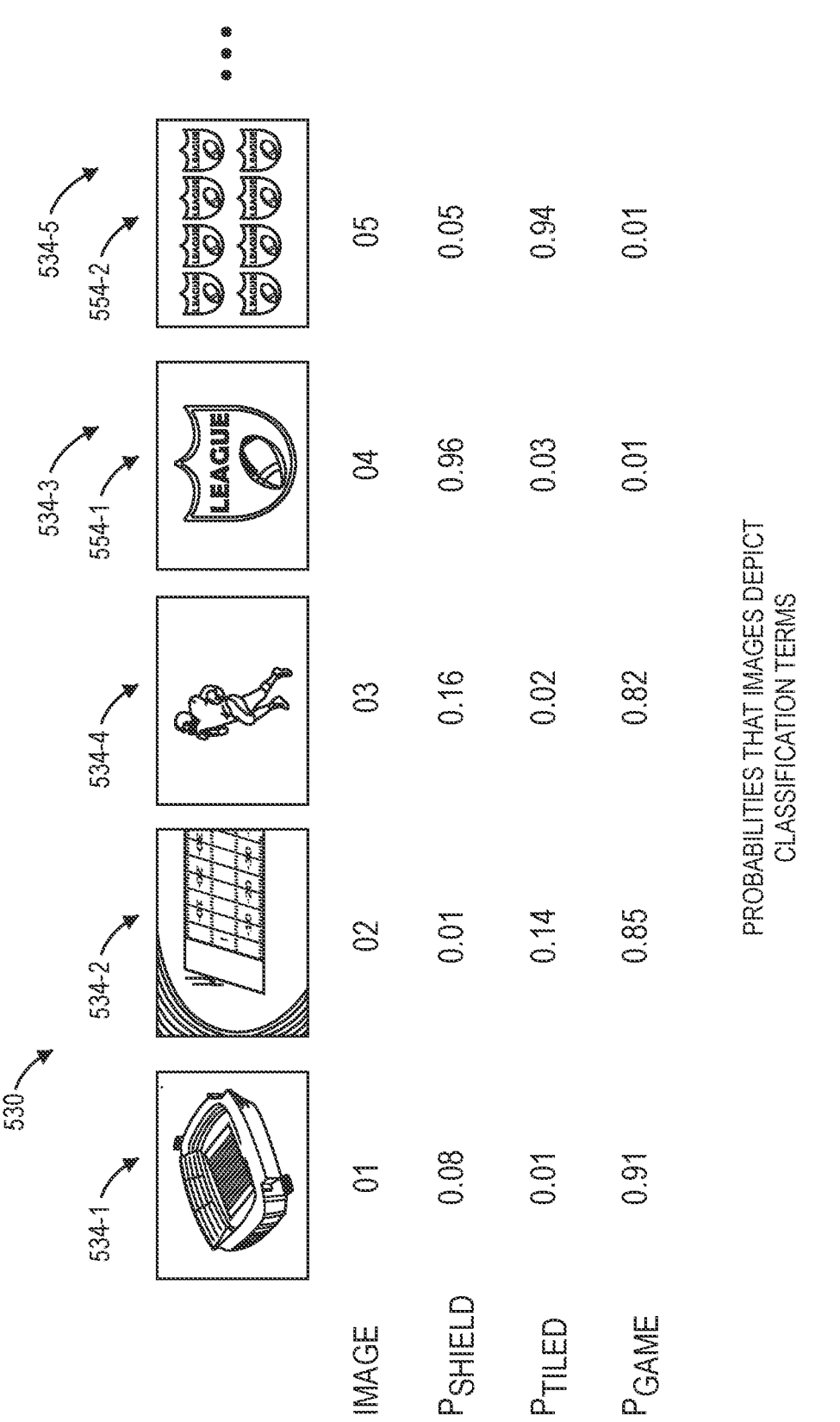

In accordance with implementations of the present disclosure, a model including a text encoder may generate text embeddings for each of the classification terms 554-1, 554-2, 554-3, viz., "shield," "tiled shields," and "game." The model may also include an image encoder that generates image embeddings for each of the image frames of the multimedia file 530, and calculates probabilities that each of such images depicts an object or content consistent with one of the classification terms 554-1, 554-2, 554-3. As is shown in FIG. 5C, for example, a probability $P_{SHIELD}$ that a first image 534-1 depicts an object or content consistent with the classification term 554-1, viz., "shield," is approximately 0.08, while a probability $P_{TILED}$ that the first image 534-1 depicts an object or content consistent with the classification term 554-2, viz., "tiled shields," is approximately 0.01, and a probability $P_{GAME}$ that the first image 534-1 depicts an object or content consistent with the classification term 554-3, viz., "game," is approximately 0.91. Likewise, the probabilities $P_{SHIELD}$, $P_{TILED}$, $P_{GAME}$ that a second image 534-2 depicts objects or content consistent with the classification terms 554-1, 554-2, 554-3 are approximately 0.01, 0.14 and 0.85, respectively. The probabilities $P_{SHIELD}$, $P_{TILED}$, $P_{GAME}$ that a third image 534-3 depicts objects or content consistent with the classification terms 554-1, 554-2, 554-3 are approximately 0.96, 0.03 and 0.01, respectively. The probabilities $P_{SHIELD}$, $P_{TILED}$, $P_{GAME}$ that a fourth image 534-4 depicts objects or content consistent with the classification terms 554-1, 554-2, 554-3 are approximately 0.16, 0.02 and 0.82, respectively, and the probabilities $P_{SHIELD}$, $P_{TILED}$, $P_{GAME}$ that a fifth image 534-5 depicts objects or content consistent with the classification terms 554-1, 554-2, 554-3 are approximately 0.05, 0.94 and 0.01, respectively.

The generation of image embeddings from images and the calculation of probabilities that each of such images is consistent with one of the classification terms 554-1, 554-2, 554-3 shown in FIG. 5C may be repeated for each of the image frames of the multimedia file 530. Where image frames of the multimedia file 530 are determined to be consistent with the pattern identified by the user, a relevant portion of the multimedia file 530 may be identified accordingly.

Figure 5D:
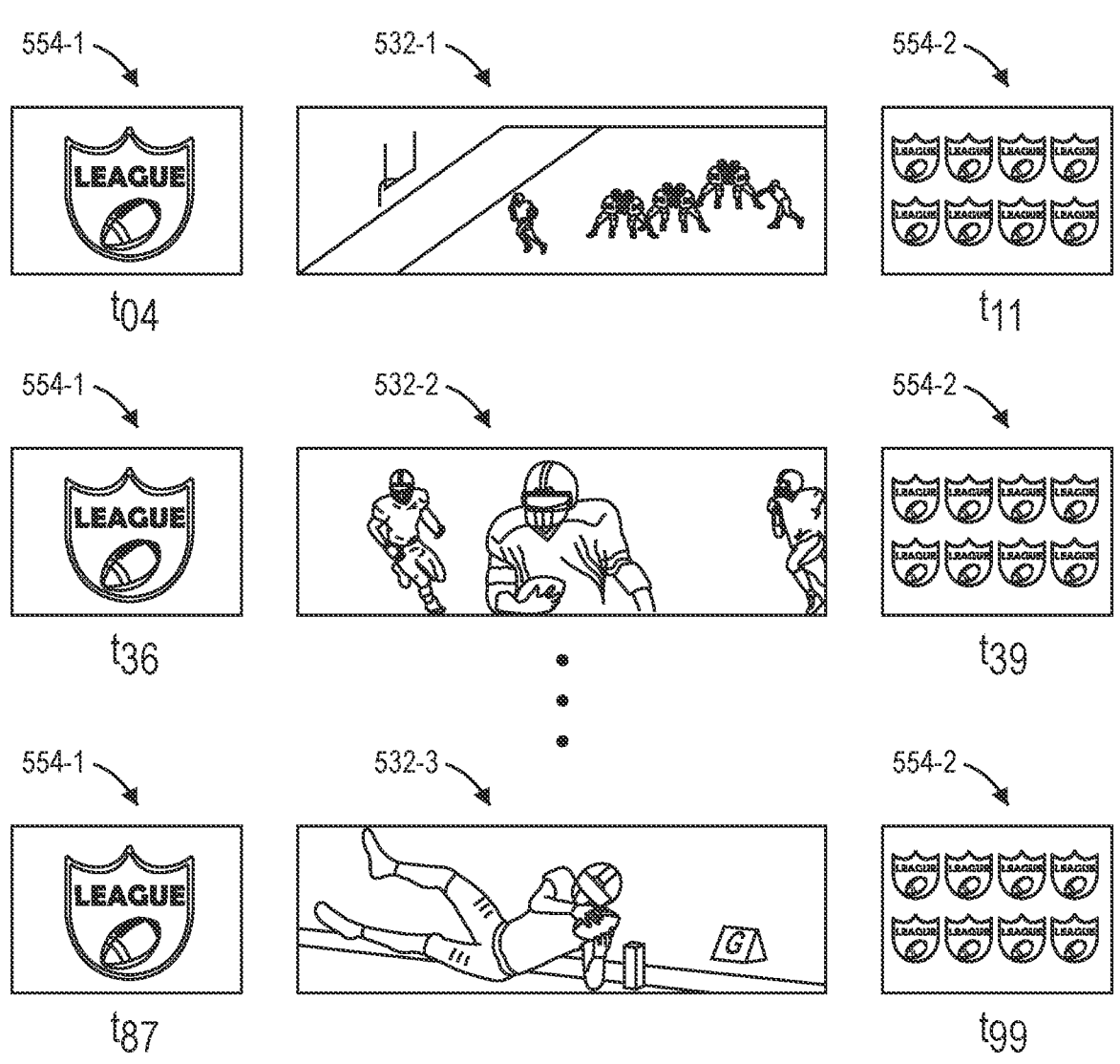

As is shown in FIG. 5D, relevant portions of the multimedia file 530 are identified where images consistent with the pattern, viz., depicting an object or content consistent with the classification term 554-1, or "shield," and an object or content consistent with the classification term 554-2, or "tiled shields," separated by a range of five to twenty seconds. For example, a first relevant portion 532-1 of the multimedia file 530 is identified where images consistent with classification terms 554-1, 554-2 are detected at time $t_{04}$ and time $t_{11}$, respectively, while a second relevant portion 532-2 of the multimedia file 530 is identified where images consistent with classification terms 554-1, 554-2 are detected at time $t_{36}$ and time $t_{39}$, and a third relevant portion 532-3 of the multimedia file 530 is identified where images consistent with classification terms 554-1, 554-2 are detected at time $t_{87}$ and time $t_{99}$. The relevant portions 532-1, 532-2, 532-3 may be utilized for any purpose, such as to generate a summary of a broadcast of a live event that was represented in the multimedia file 530, or for any other purpose.

Figure 6A:
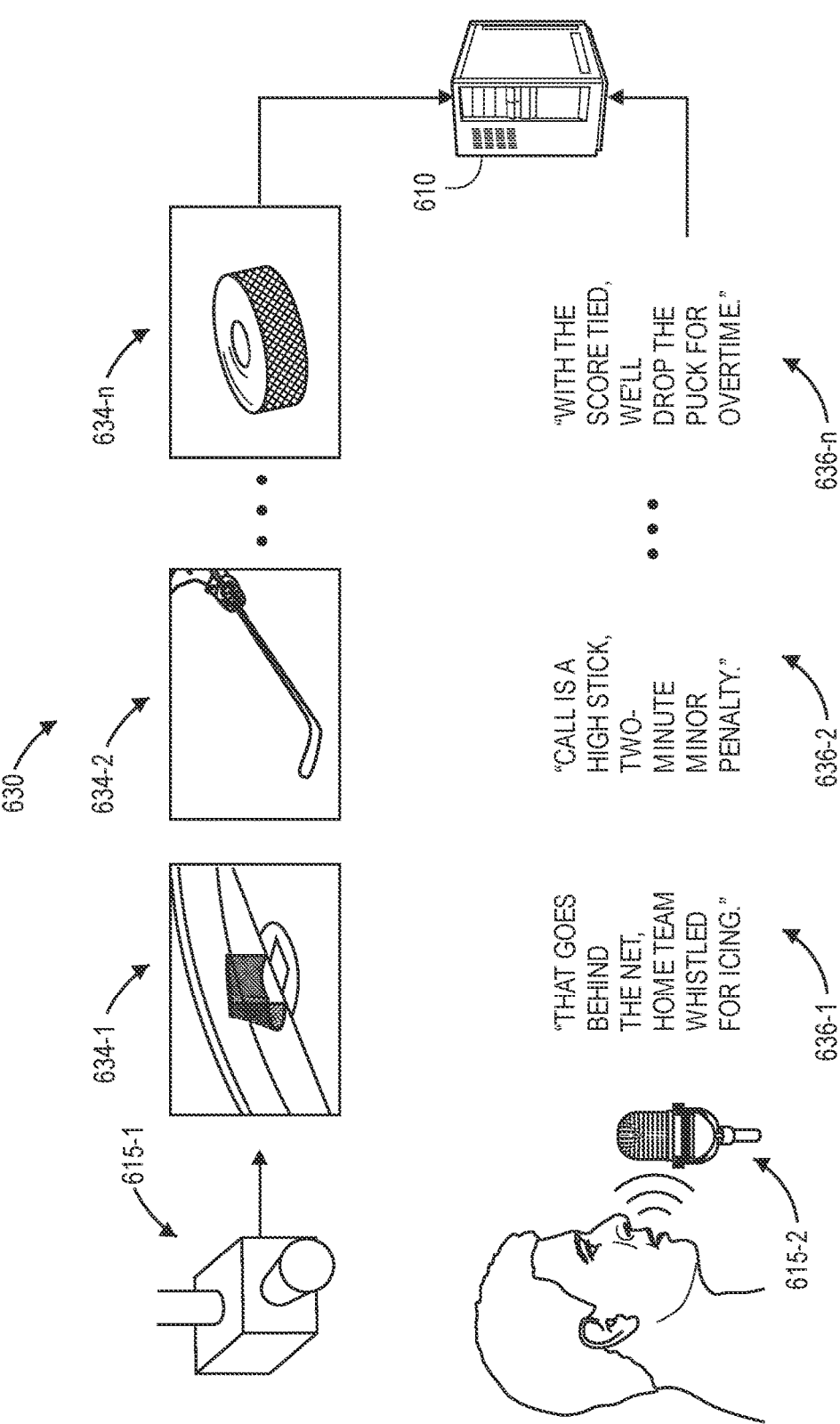
FIGS. 6A and 6B are views of aspects of one system for detecting relevant portions of video files in accordance with implementations of the present disclosure.
Figure 6B:
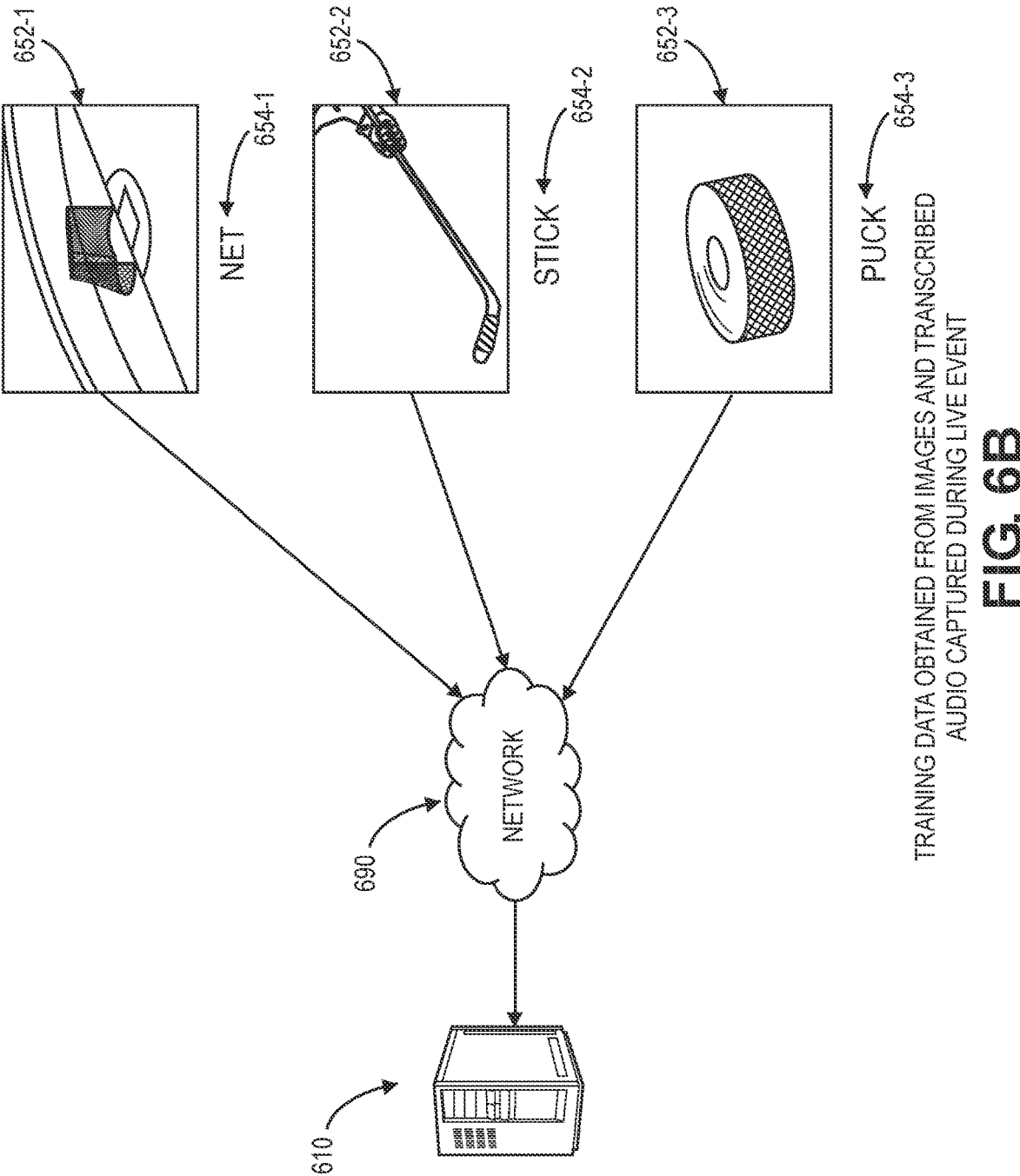

Sets of training data including pairs of images and text descriptors for training image encoders and text encoders of models may be obtained from any sources. Where a multimedia file includes a plurality of images, text for describing or labeling such images may be identified by transcribing spoken words represented in one or more audio signals that accompanied the images, and associating the transcribed words with the respective images. Referring to FIGS. 6A and 6B, views of aspects of one system for detecting relevant portions of video files in accordance with implementations of the present disclosure is shown. Except where otherwise noted, reference numerals preceded by the number "6" shown in FIG. 6A or FIG. 6B indicate components or features that are similar to components or features having reference numerals preceded by the number "5" shown in FIGS. 5A through 5D, by the number "4" shown in FIGS. 4A and 4B, by the number "2" shown in FIG. 2 or by the number "1" shown in FIGS. 1A through 1G.

As is shown in FIG. 6A, during a broadcast of a live event, a camera 615-1 and a microphone 615-2 capture and images 634-1, 634-2 . . . 634-n and audio signals 636-1, 636-2 . . . 636-n concurrently. A multimedia file 630 including the images 634-1, 634-2 . . . 634-n and the audio signals 636-1, 636-2 . . . 636-n is transmitted to a server 610, which may be associated with a media distribution system or any other entity.

As is shown in FIG. 6B, the server 610 processes the images and the audio signals to identify sets of text associated with such images, e.g., by transcribing the audio signals into words, and selecting one or more of the words to be associated with each of such images. As is shown in FIG. 6B, where the multimedia file 630 includes a first image 652-1 depicting a net or goal on a hockey rink, a first descriptor 654-1 of the first image 652-1 may be derived from a first audio signal 636-1 transmitted proximate in time with the first image 652-1, viz., "net." The first descriptor 654-1 may be identified in any manner, such as by processing the first audio signal 636-1 according to any natural language processing ("NLP") or natural language understanding ("NLU") techniques. The first image 652-1 and the first descriptor 654-1 may be stored on any external resource, e.g., in one or more alternate or virtual locations, such as in a "cloud"-based environment.

Similarly, where the multimedia file 630 includes a second image 652-2 depicting a hockey stick carried by a hockey player, a second descriptor 654-2 of the second image 652-2 may be derived from a second audio signal 636-2 transmitted proximate in time with the second image 652-2, viz., "stick." Where the multimedia file 630 includes a third image 652-3 depicting a hockey puck, a third descriptor 654-3 of the third image 652-3 may be derived from a third audio signal 636-3 transmitted proximate in time with the third image 652-3, viz., "puck." Once the images 652-1, 652-2, 652-3 and the descriptors 654-1, 654-2, 654-3 have been identified, the images 652-1, 652-2, 652-3 and the descriptors 654-1, 654-2, 654-3 may be stored in association with one another in one or more locations, and provided as training inputs to a model having an image encoder and a text encoder at any time.

Alternatively, in some implementations, pairs of images and text descriptors may be identified in any other manner and from any other source. For example, text descriptors of images may be generated by one or more humans. Additionally, where a network page or site is generated based on sets of code that include tags or references identifying images by file names or locations, such sets of code may also include alternate text identifying appearances, purposes or functions of the images. Images and text descriptors may also be obtained from any social media platforms, pages, postings or accounts, or in any other manner.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIG. 3, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features.

Except where otherwise noted, one or two left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately,"

"generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:

at least one computer server having at least one computer processor, wherein the at least one computer server is programmed with one or more sets of instructions that, when executed, cause the system to execute a method comprising:

training a model to generate image embeddings and text embeddings based at least in part on a first set of images and a first set of text descriptors, wherein each of the first set of text descriptors describes one of the first set of images, and wherein the model is trained to maximize cosine similarities of image embeddings generated for images and text embeddings generated for text descriptors of the images;

identifying at least one multimedia file transmitted to a plurality of personal devices, wherein the at least one multimedia file comprises a second set of images and a second set of audio signals transmitted to the plurality of personal devices in a broadcast of an organized event;

receiving a plurality of classification terms from a user;

providing the plurality of classification terms as inputs to the model;

receiving a plurality of text embeddings as outputs from the model, wherein each of the plurality of text embeddings is generated by a text encoder for one of the plurality of classification terms;

providing the second set of images as inputs to the model;

receiving a plurality of image embeddings as outputs from the model, wherein each of the plurality of image embeddings is generated by an image encoder for one of the second set of images;

calculating probabilities that each of the second set of images corresponds to one of the plurality of classification terms based at least in part on the plurality of text embeddings and the plurality of image embeddings;

determining that a first probability that a first image of the second set of images displayed at a first time corresponds to a first classification term of the plurality of classification terms exceeds a predetermined threshold;

determining that a second probability that a second image of the second set of images displayed at a second time corresponds to a second classification term of the plurality of classification terms exceeds the predetermined threshold; and identifying at least one portion of the at least one multimedia file transmitted to the plurality of personal devices between the second time and the first time; and after the organized event has concluded, transmitting the at least one portion of the at least one multimedia file to a first personal device, wherein the first personal device is not one of the plurality of personal devices.

2. The system of claim 1, wherein the method further comprises:

receiving information regarding a pattern of images from the user, wherein the information regarding the pattern of images identifies:

the first classification term;

the second classification term; and a duration, wherein a difference between the second time and the first time is not greater than the duration.

3. The system of claim 1, wherein the at least one portion of the at least one multimedia file depicts at least one activity that occurred prior to the first time.

4. The system of claim 1, wherein the organized event comprises:

a baseball game;

a basketball game;

a football game;

a golf match;

a hockey game;

a soccer game; or a tennis match.

5. A computer-implemented method comprising:

transmitting at least a first video file to a plurality of personal devices in a broadcast of a first organized event over one or more networks;

receiving information regarding at least a first text descriptor from a user;

providing at least the first text descriptor to a model as a first input, wherein the model comprises a text encoder and an image encoder, and wherein the model is trained to generate image embeddings representative of images and text embeddings representative of sets of text in a latent space;

receiving at least a first text embedding from the model as a first output in response to the first input, wherein the first text embedding represents the first text descriptor;

providing a first plurality of images to the model as second inputs, wherein each of the first plurality of images is included in the first video file;

receiving a first plurality of image embeddings from the model as second outputs in response to the second inputs, wherein each of the first plurality of image embeddings is in the latent space with at least the first text embedding;

determining probabilities that each of the first plurality of images is consistent with at least the first text descriptor based at least in part on the first output and the second outputs;

selecting a first portion of the first video file based at least in part on a first image of the first plurality of images and a first probability that the first image is consistent with the first text descriptor; and after the first organized event has concluded, transmitting at least the first portion of the first video file to a first personal device over the one or more networks, wherein the first personal device is not one of the plurality of personal devices.

6. The computer-implemented method of claim 5, wherein selecting the first portion of the first video file comprises:

determining that the first probability that the first image is consistent with the first text descriptor exceeds a predetermined threshold, wherein the first image was transmitted at a first time during the broadcast of the first organized event; and determining that a second probability that a second image of the first plurality of images is consistent with a second text descriptor exceeds the predetermined threshold, wherein the second image was transmitted at a second time during the broadcast of the first organized event, and wherein the first portion of the first video file was transmitted during the broadcast of the first organized event between the first time and the second time.

7. The computer-implemented method of claim 5, wherein the text encoder is a first transformer, wherein the image encoder is a second transformer, and wherein the method further comprises:

identifying a plurality of sets of data, wherein each of the plurality of sets of data comprises one of a second plurality of images and one of a second set of text descriptors, and wherein each of the second set of text descriptors describes content of one of the second plurality of images; and training the model to associate images and text descriptors based at least in part on at least some of the plurality of sets of data, wherein the model comprises a text encoder and an image encoder, wherein the model is trained based at least in part on a second plurality of image embeddings generated by the image encoder based on one of the second plurality of images and a second plurality of text embeddings generated by the text encoder based on one of the second plurality of text embeddings, and wherein each of the second plurality of image embeddings is in the latent space with each of the second plurality of text embeddings.

8. The computer-implemented method of claim 7, wherein training the model comprises:

training the model to maximize cosine similarities between the one of the second plurality of images and the one of the second plurality of text descriptors of each of the plurality of sets of data; and training the model to minimize cosine similarities between one of the second plurality of images of one of the plurality of sets of data and each of the second plurality of text descriptors of other sets of data of the plurality of sets of data.

9. The computer-implemented method of claim 7, further comprising:

identifying code for rendering a network site;

identifying at least one image referenced in the code for rendering the network site, wherein the first plurality of images comprises the at least one image;

identifying at least one set of text referenced in the code for rendering the network site, wherein the at least one set of text is associated with the at least one image; and generating a set of data comprising the at least one image and the at least one set of text, wherein the set of data is one of the plurality of sets of data.

10. The computer-implemented method of claim 7, further comprising:

identifying a second video file transmitted during a broadcast of a second organized event, wherein the second video file comprises a third plurality of images, and wherein a third image of the third plurality of images was captured at a first time;

identifying an audio file transmitted during the broadcast of the second organized event, wherein the audio file was transmitted concurrently with the second video file;

detecting at least one word in the audio file, wherein the at least one word was spoken at approximately the first time; and generating a set of data comprising the third image and the at least one word, wherein the set of data is one of the plurality of sets of data.

11. The computer-implemented method of claim 5, wherein the first organized event comprises:

a baseball game;

a basketball game;

a football game;

a golf match;

a hockey game;

a soccer game; or a tennis match.

12. The computer-implemented method of claim 5, wherein each of the first plurality of images was captured at a venue at which the first organized event occurred, and wherein the venue is one of an amphitheater, an arena, an auditorium, a ballpark, a convention center, a resort, a restaurant, a stadium or a theater.

13. A computer-implemented method comprising:

receiving information regarding a pattern of images from a user, wherein the information regarding the pattern of images identifies:

a plurality of text descriptors; and a duration;

providing at least a first text descriptor and a second text descriptor to a model as first inputs, wherein the plurality of text descriptors includes at least the first text descriptor and the second text descriptor, wherein the model comprises a text encoder trained to at least generate text embeddings from text descriptors and an image encoder trained to at least generate image embeddings from images, and wherein the model is further trained to determine similarities between text embeddings and image embeddings;

receiving at least a first text embedding and a second text embedding from the model as first outputs in response to the first inputs, wherein the first text embedding represents the first text descriptor, and wherein the second text embedding represents the second text descriptor;

providing a plurality of images to the model as second inputs, wherein each of the plurality of images is included in a video file transmitted in a broadcast of an organized event;

receiving a plurality of image embeddings from the model as second outputs in response to the second inputs, wherein each of the plurality of image embeddings is in a latent space with at least the first text embedding and the second text embedding;

determining probabilities that each of the plurality of images is consistent with at least the first text descriptor and the second text descriptor based at least in part on the first outputs and the second outputs;

determining that a first probability that a first image of the plurality of images is consistent with the first text descriptor exceeds a predetermined threshold, wherein the first image was transmitted at a first time during the broadcast of the organized event;

determining that a second probability that a second image of the plurality of images is consistent with a second text descriptor of the plurality of text descriptors exceeds the predetermined threshold, wherein the second image was transmitted at a second time during the broadcast of the organized event, and wherein a difference between the second time and the first time is not greater than the duration;

selecting a portion of the video file based at least in part on the first image, the first probability, the second image and the second probability, wherein the portion of the video file was transmitted during the broadcast of the organized event between the first time and the second time.

14. A computer-implemented method comprising:

receiving information regarding at least a first text descriptor from a user;

providing at least the first text descriptor to a model as a first input, wherein the model comprises a text encoder and an image encoder, and wherein the model is trained to generate image embeddings representative of images that are similar to text embeddings representative of sets of text in a latent space;

receiving at least a first text embedding from the model as a first output in response to the first input, wherein the first text embedding represents the first text descriptor;

providing a first plurality of images to the model as second inputs, wherein each of the first plurality of images is included in a first video file transmitted in a broadcast of a first organized event;

receiving a first plurality of image embeddings from the model as second outputs in response to the second inputs, wherein each of the first plurality of image embeddings is in the latent space with at least the first text embedding;

determining probabilities that each of the first plurality of images is consistent with at least the first text descriptor based at least in part on the first output and the second outputs; and selecting a first portion of the first video file based at least in part on a first image of the first plurality of images and a first probability that the first image is consistent with the first text descriptor, wherein the first portion of the first video file is transmitted following a second portion of the first video file and prior to a third portion of the first video file, and wherein the first portion of the first video file depicts at least one activity that occurred prior to the transmission of the first portion of the first video file.

15. The computer-implemented method of claim 14, further comprising:

transmitting at least the first video file to a plurality of personal devices over one or more networks;

after the first organized event has concluded, transmitting at least the first portion of the first video file to a first personal device, wherein the first personal device is not one of the plurality of personal devices.

16. A computer-implemented method comprising:

providing a first plurality of images to a model as first inputs, wherein each of the first plurality of images is included in a first video file transmitted during a broadcast of an organized event, wherein the model comprises a text encoder and an image encoder, and wherein the model is trained to maximize cosine similarities of image embeddings generated for images in a latent space and text embeddings generated for text descriptors of the images in the latent space;

receiving a first plurality of image embeddings from the model as first outputs in response to the first inputs;

providing a first plurality of text descriptors to the model as second inputs;

receiving a first plurality of text embeddings from the model as second outputs in response to the second inputs, wherein each of the first plurality of text embeddings represents one of the first plurality of text descriptors;

calculating probabilities that each of the first plurality of images is consistent with one of the first plurality of text descriptors based at least in part on the first outputs and the second outputs;

determining that a first probability that a first image of the first plurality of images transmitted at a first time is consistent with a first descriptor of the first plurality of text descriptors exceeds a predetermined threshold;

determining that a second probability that a second image of the first plurality of images transmitted at a second time is consistent with a second descriptor of the first plurality of text descriptors exceeds the predetermined threshold; and identifying a second plurality of images, wherein each of the second plurality of images is included in the first video file, and wherein each of the second plurality of images was transmitted between the first time and the second time; and after the organized event has concluded, transmitting a second video file including the second plurality of images to at least one personal device.

17. The computer-implemented method of claim 16, further comprising:

receiving information regarding a pattern of images, wherein the information regarding the pattern of images identifies:

the first descriptor;

the second descriptor; and a duration, wherein a difference between the second time and the first time is not greater than the duration.

18. The computer-implemented method of claim 16, further comprising:

identifying code for rendering a network site;

identifying at least one image referenced in the code for rendering the network site, wherein the first plurality of images comprises the at least one image;

identifying at least one set of text referenced in the code for rendering the network site, wherein the at least one set of text is associated with the at least one image;

generating a set of data comprising the at least one image and the at least one set of text; and training the model based at least in part on the set of data.

19. The computer-implemented method of claim 16, wherein each of the second plurality of images depicts an activity that occurred prior to the first time.

20. The computer-implemented method of claim 16, wherein the organized event comprises:

a baseball game;

a basketball game;

a football game;

a golf match;

a hockey game;

a soccer game; or a tennis match.

* * * * *